United States Patent
Josiam et al.

(10) Patent No.: US 9,392,639 B2
(45) Date of Patent: Jul. 12, 2016

(54) METHODS AND APPARATUS FOR CHANNEL SOUNDING IN BEAMFORMED MASSIVE MIMO SYSTEMS

(71) Applicant: Samsung Electronics Co., LTD, Suwon-si, Gyeonggi-do (KR)

(72) Inventors: Kaushik Morapakkam Josiam, Dallas, TX (US); Rakesh Taori, McKinney, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 276 days.

(21) Appl. No.: 14/035,596

(22) Filed: Sep. 24, 2013

(65) Prior Publication Data
US 2014/0241242 A1    Aug. 28, 2014

Related U.S. Application Data

(60) Provisional application No. 61/770,177, filed on Feb. 27, 2013.

(51) Int. Cl.
*H04W 88/08* (2009.01)
*H04W 88/02* (2009.01)
*H04L 5/00* (2006.01)

(52) U.S. Cl.
CPC .............. *H04W 88/08* (2013.01); *H04L 5/0035* (2013.01); *H04L 5/0048* (2013.01); *H04W 88/02* (2013.01); *H04L 5/0091* (2013.01)

(58) Field of Classification Search
None
See application file for complete search history.

(56) References Cited

U.S. PATENT DOCUMENTS

| | | |
|---|---|---|
| 2009/0274226 A1 | 11/2009 | Mondal et al. |
| 2011/0116436 A1* | 5/2011 | Bachu .................. H04L 5/0048 370/312 |
| 2011/0171964 A1 | 7/2011 | Lin et al. |
| 2011/0317608 A1 | 12/2011 | Li et al. |
| 2012/0014349 A1* | 1/2012 | Chung ................ H04B 7/0684 370/329 |

(Continued)

FOREIGN PATENT DOCUMENTS

| | | |
|---|---|---|
| KR | 10-2012-0024645 A | 3/2012 |
| WO | WO 2010-029413 A1 | 3/2010 |

OTHER PUBLICATIONS

International Search Report dated May 29, 2014 in connection with Interational Patent Application No. PCT/KR2014/001549; 3 pp.

(Continued)

*Primary Examiner* — Alex Skripnikov

(57) ABSTRACT

Base station (BS) and mobile station (MS) methods and apparatus are provided. The BS configures an uplink sounding channel made up of at least one OFDM symbol in an uplink slot. The BS signals to the MS use and location of different configurations of the uplink sounding channel via a system configuration broadcast message. The uplink sounding channel comprises OFDM symbols where one or more of a sub-carrier spacing and a sampling frequency is different from that of OFDM symbol used for data transmission. Each OFDM symbol comprises a sounding reference symbol corresponding to at least one transmit beam and is received by at least one receive beam to form at least one transmit-receive beam pair. The at least one transmit-receive beam pair for UL-SRS in different OFDM symbols are different. The sounding channel configuration is based on information received from neighboring BSs via inter-BS coordination over a pre-defined interface.

12 Claims, 18 Drawing Sheets

(56) References Cited

U.S. PATENT DOCUMENTS

2012/0170525 A1\* 7/2012 Sorrentino ............ H04L 5/0007
370/329
2013/0222182 A1\* 8/2013 Nakasato ............ H04L 27/2613
342/368
2014/0036859 A1\* 2/2014 Ekpenyong ......... H04W 72/042
370/330

OTHER PUBLICATIONS

Written Opinion dated May 29, 2014 in connection with International Patent Application No. PCT/KR2014/001549; 7 pp.

\* cited by examiner

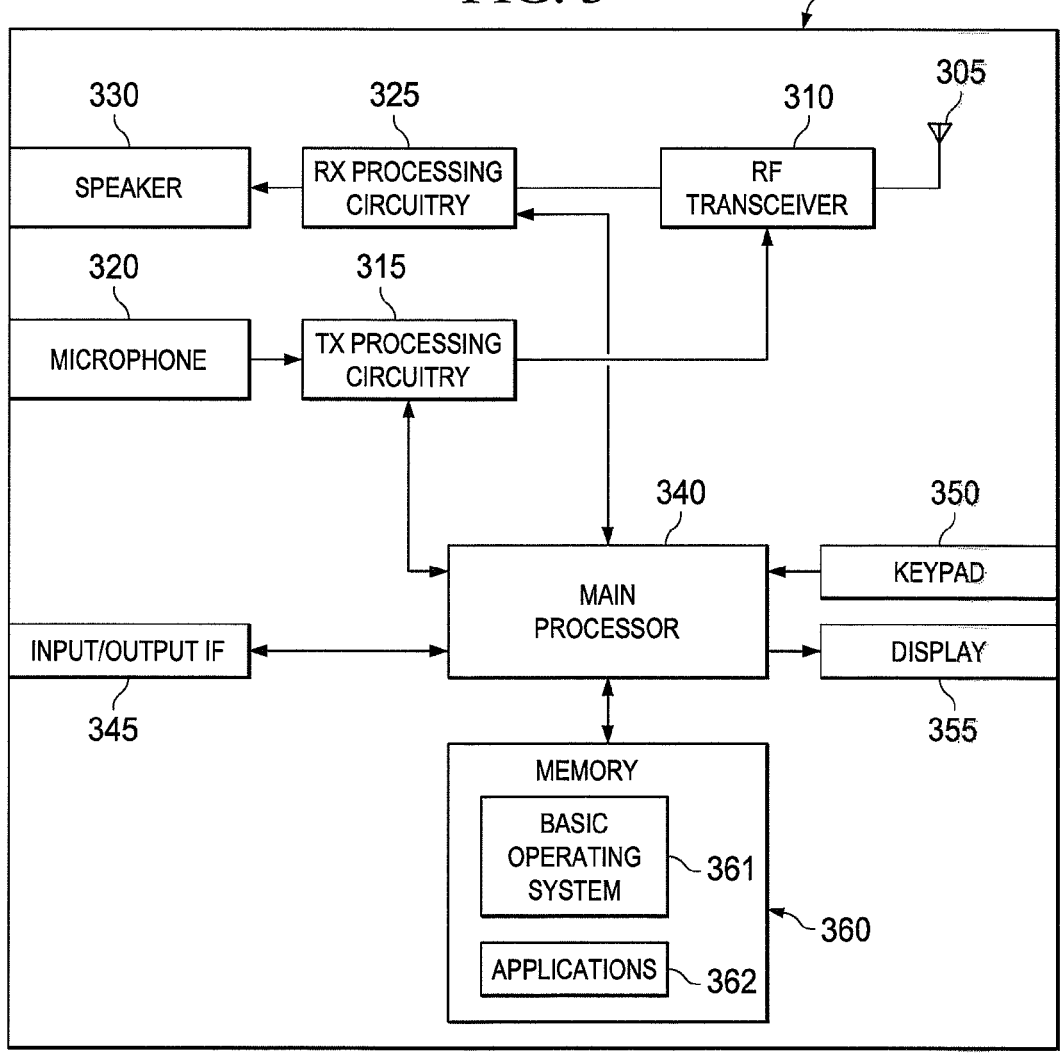

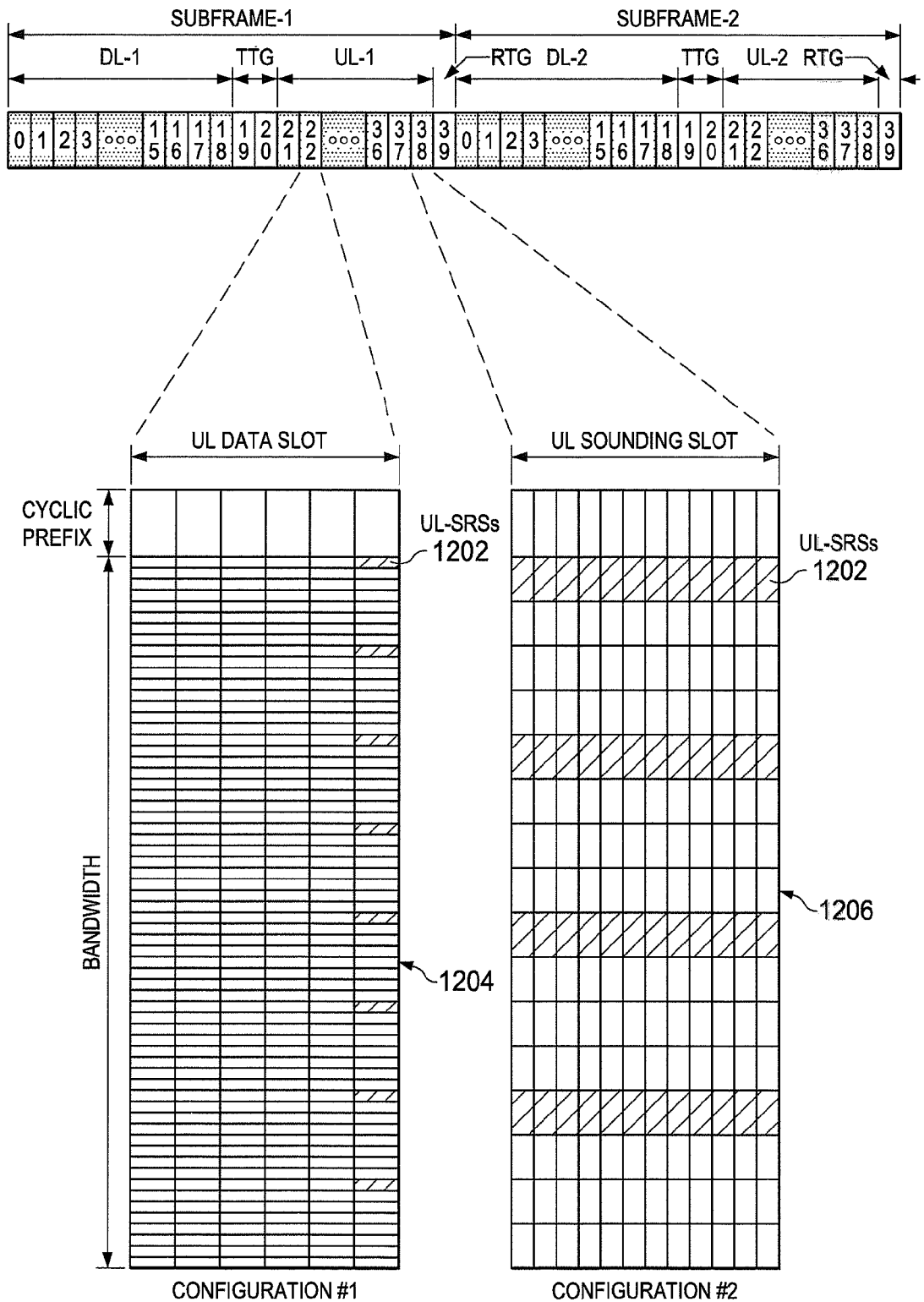

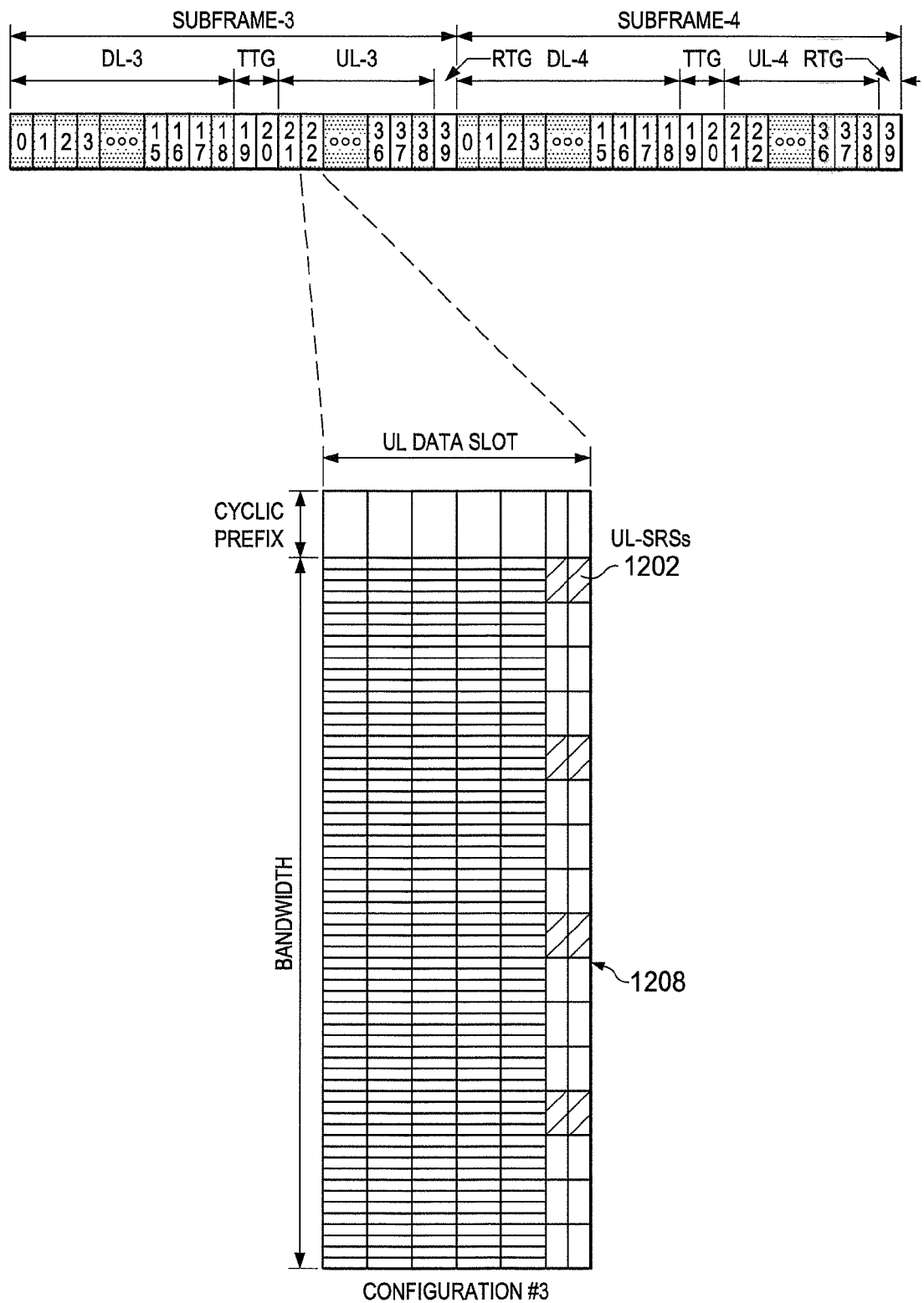

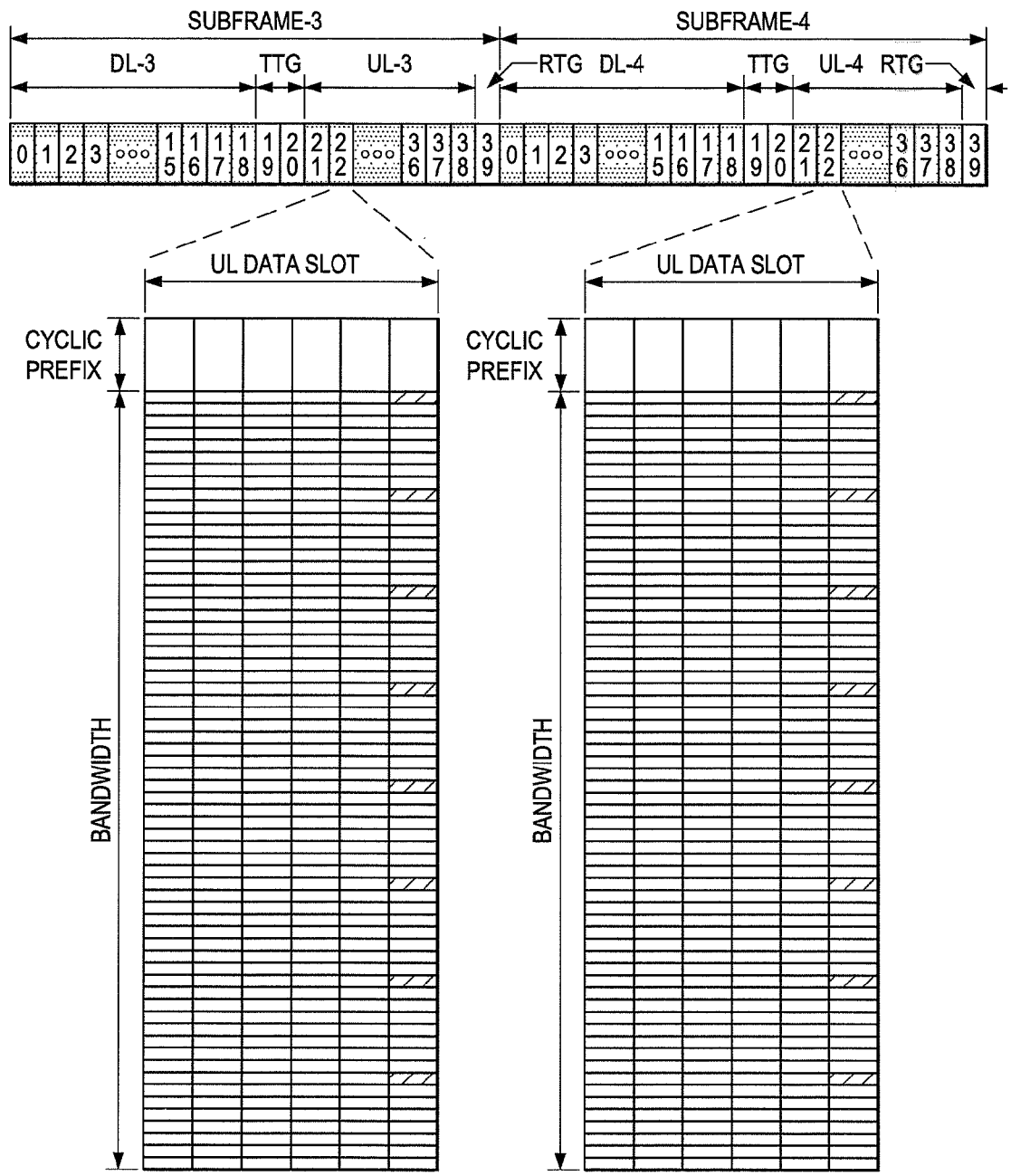

METHODS AND APPARATUS FOR CHANNEL SOUNDING IN BEAMFORMED MASSIVE MIMO SYSTEMS

CROSS-REFERENCE TO RELATED APPLICATION(S) AND CLAIM OF PRIORITY

The present application claims priority to U.S. Provisional Patent Application Ser. No. 61/770,177, filed Feb. 27, 2013, entitled "METHODS AND APPARATUS FOR CHANNEL SOUNDING IN BEAMFORMED MASSIVE MIMO SYSTEMS". The content of the above-identified patent document is incorporated herein by reference.

TECHNICAL FIELD

The present application relates generally to wireless telecommunication systems and, more specifically, to channel sounding in beamformed massive MIMO systems.

BACKGROUND

Cellular systems are expected to evolve from today's 4G (LTE, 802.16m) to 5G which promise even larger data rates (up to 100 times greater). One of the candidates for 5G system is the use of millimeter wave bands in place of current PCS microwave bands used in 4G systems. The millimeter wave frequencies are an order of magnitude greater than today's PCS bands.

The nature of propagation is different in millimeter wave bands in that the propagation loss in free space is much larger than what is observed in the microwave bands. Given the shorter wavelength, the size of the antenna required to transmit millimeter waves is much smaller compared to those required for microwave bands. However, the smaller antennae can be packed in an area comparable to the antenna area for a microwave band. When this antenna array is "operated" synchronously, they form a beam whose gain can make up for the higher propagation loss.

In beamformed systems, a links from a mobile station to a base station use uplink channel sounding for sensing channel quality of transmissions to enable and enhance connections between the mobile station and the base station. Adding the use of multiple beams for both the mobile station and the base station increases complexity of uplink channel sounding.

SUMMARY

A method of a base station (BS) for communicating with a mobile station (MS) is provided. The BS configures an uplink sounding channel made up of at least one OFDM symbol in an uplink slot. The BS signals to the MS use and location of different configurations of the uplink sounding channel via a system configuration broadcast message. The uplink sounding channel comprises OFDM symbols where one or more of a subcarrier spacing and a sampling frequency is different from that of OFDM symbol used for data transmission. Each OFDM symbol comprises a sounding reference symbol corresponding to at least one transmit beam and is received by at least one receive beam to form at least one transmit-receive beam pair. The at least one transmit-receive beam pair for UL-SRS in different OFDM symbols are different. The sounding channel configuration is based on information received from neighboring BSs via inter-BS coordination over a pre-defined interface.

A method of a base station (BS) for communicating with a mobile station (MS) is provided. An uplink sounding channel is configured for the MS using an uplink configuration message. The uplink configuration message specifies if the UL-SRS is to be transmitted over one of an uplink slot and a particular uplink sounding configuration. A number of beams for which UL-SRS is to be transmitted is indicated in the uplink configuration message. A particular transmit beam is repeated over a different OFDM symbol according to a parameter in the uplink configuration message. A periodicity with which the UL-SRS is to be transmitted is indicated in the uplink configuration message.

A method of a base station (BS) for communicating with a mobile station (MS) is provided. Multiple uplink sounding channels are configured for the MS. The multiple sounding channels comprise different periodicities and different configurations for transmitting UL-SRSs. The BS configures multiple sounding assignments based on one or more parameters comprising mobile speed, CQI reports, and RACH reception from the MS. A first sounding channel is used to scan different transmit receive pairs and a second sounding channel is used to scan a subset of different transmit receive pairs from the first sounding channel and a third sounding channel is used to scan a subset of different transmit receive pairs from the first sounding channel and the second sounding channel.

A method of a mobile station (MS) for communicating with a base station (BS) is provided. The MS transmits an uplink sounding reference symbol (UL-SRS) via an uplink sounding channel made up of at least one OFDM symbol in an uplink slot. The MS receives from the BS signaling indicating use and location of different configurations of the uplink sounding channel via a system configuration broadcast message. The uplink sounding channel comprises OFDM symbols where one or more of a subcarrier spacing and a sampling frequency is different from that of OFDM symbol used for data transmission. Each OFDM symbol comprises a sounding reference symbol corresponding to at least one transmit beam and is received by at least one receive beam to form at least one transmit-receive beam pair. The at least one transmit-receive beam pair for UL-SRSs in different OFDM symbols are different. The sounding channel configuration is based on information received from neighboring BSs via inter-BS coordination over a pre-defined interface.

A method of a mobile station (MS) for communicating with a base station (BS) is provided. An uplink configuration message is received that configures the uplink sounding channel. The uplink configuration message specifies if the UL-SRS is to be transmitted over one of an uplink slot and a particular uplink sounding configuration. A number of beams for which UL-SRS is to be transmitted is indicated in the uplink configuration message. A particular transmit beam is repeated over a different OFDM symbol according to a parameter in the uplink configuration message. A periodicity with which the UL-SRS is to be transmitted is indicated in the uplink configuration message.

A method of a mobile station (MS) for communicating with a base station (BS) is provided. Multiple uplink sounding channels configured by the BS are transmitted on. The multiple sounding channels comprise different periodicities and different configurations for transmitting UL-SRSs. Multiple sounding assignments are configured by the BS based on one or more parameters comprising mobile speed, CQI reports, and RACH reception from the MS. A first sounding channel is used to scan different transmit receive pairs and a second sounding channel is used to scan a subset of different transmit receive pairs from the first sounding channel and a third sounding channel is used to scan a subset of different transmit receive pairs from the first sounding channel and the second sounding channel.

A mobile station (MS) for communicating with a base station (BS) is provided. The MS comprises transmit processing circuitry configured to transmit an uplink sounding reference symbol (UL-SRS) via an uplink sounding channel made up of at least one OFDM symbol in an uplink slot. The MS comprises receive processing circuitry configured to receive from the BS signaling indicating use and location of different configurations of the uplink sounding channel via a system configuration broadcast message. The uplink sounding channel comprises OFDM symbols where one or more of a subcarrier spacing and a sampling frequency is different from that of OFDM symbol used for data transmission. Each OFDM symbol comprises a sounding reference symbol corresponding to at least one transmit beam and is received by at least one receive beam to form at least one transmit-receive beam pair. The at least one transmit-receive beam pair for UL-SRSs in different OFDM symbols are different. The sounding channel configuration is based on information received from neighboring BSs via inter-BS coordination over a pre-defined interface.

A mobile station (MS) for communicating with a base station (BS) is provided. The MS comprises receive processing circuitry configured to receive an uplink configuration message that configures the uplink sounding channel. The uplink configuration message specifies if the UL-SRS is to be transmitted over one of an uplink slot and a particular uplink sounding configuration. A number of beams for which UL-SRS is to be transmitted is indicated in the uplink configuration message. A particular transmit beam is repeated over a different OFDM symbol according to a parameter in the uplink configuration message. A periodicity with which the UL-SRS is to be transmitted is indicated in the uplink configuration message.

A mobile station (MS) for communicating with a base station (BS) is provided. The MS comprises transmit processing circuitry configured to transmit on multiple uplink sounding channels configured by the BS. The multiple sounding channels comprise different periodicities and different configurations for transmitting UL-SRSs. Multiple sounding assignments are configured by the BS based on one or more parameters comprising mobile speed, CQI reports, and RACH reception from the MS. A first sounding channel is used to scan different transmit receive pairs and a second sounding channel is used to scan a subset of different transmit receive pairs from the first sounding channel and a third sounding channel is used to scan a subset of different transmit receive pairs from the first sounding channel and the second sounding channel.

A base station (BS) for communicating with a mobile station (MS) is provided. The BS comprises one or more processors to configure an uplink sounding channel made up of at least one OFDM symbol in an uplink slot. The BS comprises transmit processing circuitry configured to signal to the MS use and location of different configurations of the uplink sounding channel via a system configuration broadcast message. The uplink sounding channel comprises OFDM symbols where one or more of a subcarrier spacing and a sampling frequency is different from that of OFDM symbol used for data transmission. Each OFDM symbol comprises a sounding reference symbol corresponding to at least one transmit beam and is received by at least one receive beam to form at least one transmit-receive beam pair. The at least one transmit-receive beam pair for UL-SRS in different OFDM symbols are different. The sounding channel configuration is based on information received from neighboring BSs via inter-BS coordination over a pre-defined interface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a subscriber station according to embodiments of the present disclosure;

FIGS. 12A and 12B illustrate different configurations for multiplexing UL-SRSs in a subframe according to embodiments of the present disclosure;

FIGS. 13A and 13B illustrate UL-SRS transmission for multiple MS beams on multiple subframes according to embodiments of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular system.

Figure 1:
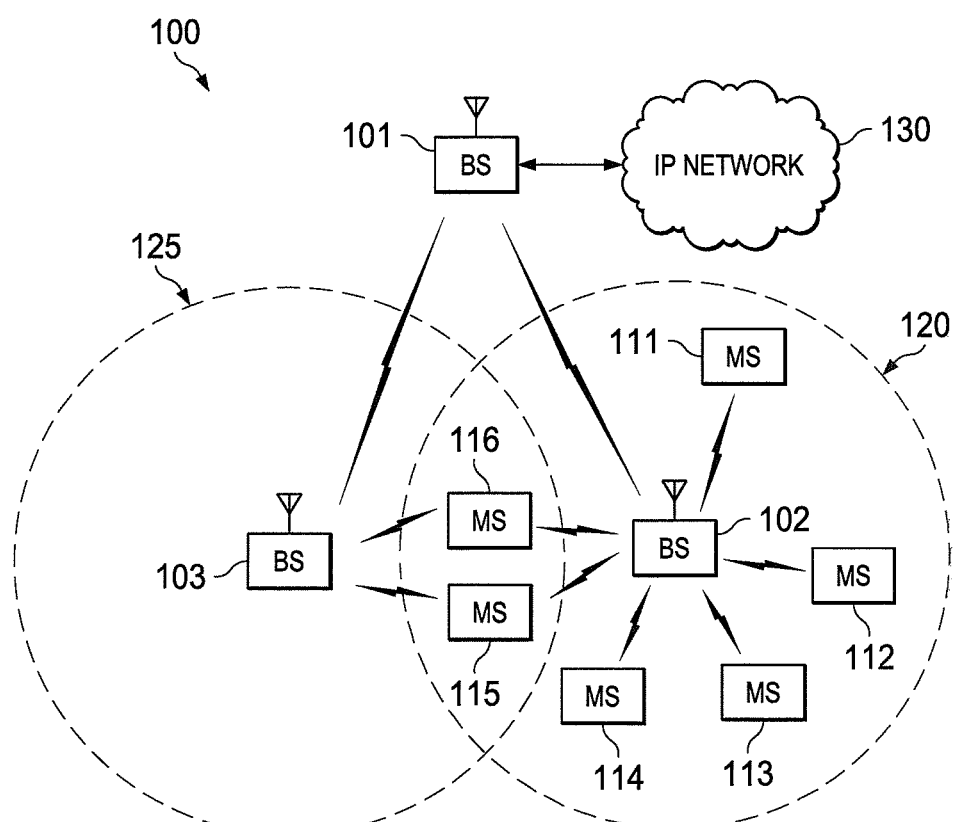
FIG. 1 illustrates a wireless network according to embodiments of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term mobile station (MS) is used herein to refer to remote terminals that can be used by a consumer to access services via the wireless communications network. Other well known terms for the remote terminals include "user equipment" and "subscriber stations."

The eNB 102 provides wireless broadband access to network 130 to a first plurality of user equipments (MSs) within coverage area 120 of eNB 102. The first plurality of MSs includes MS 111, which may be located in a small business; MS 112, which may be located in an enterprise; MS 113, which may be located in a WiFi hotspot; MS 114, which may be located in a first residence; MS 115, which may be located in a second residence; and MS 116, which may be a mobile device, such as a cell phone, a wireless laptop, a wireless PDA, or the like. MSs 111-116 may be any wireless communication device, such as, but not limited to, a mobile phone, mobile PDA and any mobile station (MS).

For the sake of convenience, the term "mobile station" or "MS" is used herein to designate any remote wireless equipment that wirelessly accesses an eNB, whether the MS is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of MSs within coverage area 125 of eNB 103. The second plurality of MSs includes MS 115 and MS 116. In some embodiments, one or more of eNBs 101-103 may communicate with each other and with MSs 111-116 with techniques for: channel sounding in beamformed massive MIMO systems as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and MSs 111-116. Wired connections may replace the wireless connections depicted in FIG. 1.

Figure 2A:
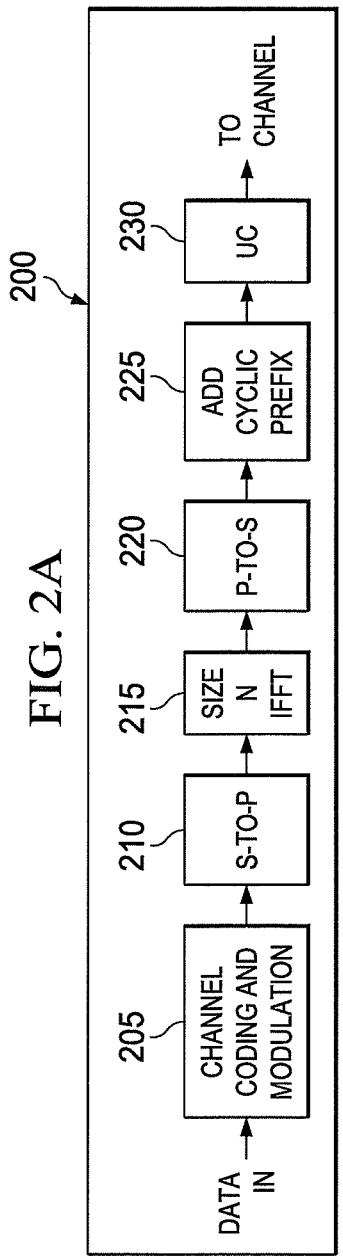
FIG. 2A illustrates a high-level diagram of a wireless transmit path according to embodiments of the present disclosure.
Figure 2B:
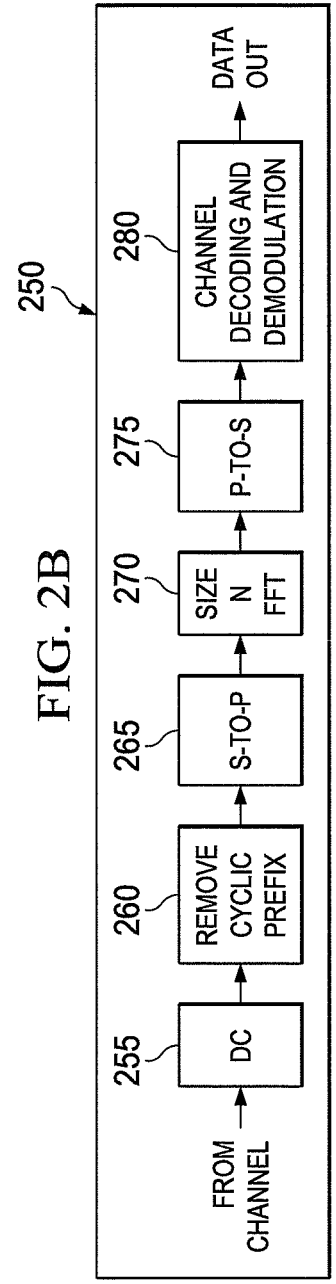
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a MS, such as MS 116 of FIG. 1. It will be understood, however, that the receive path 250 could be implemented in an eNB (e.g. eNB 102 of FIG. 1) and the transmit path 200 could be implemented in a MS. In certain embodiments, transmit path 200 and receive path 250 are configured to perform methods for channel sounding in beamformed massive MIMO systems described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to MSs 111-116 and may implement a receive path that is analogous to receiving in the uplink from MSs 111-116. Similarly, each one of MSs 111-116 may implement a transmit path corresponding to the architecture for transmitting in the uplink to eNBs 101-103 and may implement a receive path corresponding to the architecture for receiving in the downlink from eNBs 101-103.

FIG. 3 illustrates a subscriber station according to embodiments of the present disclosure. The embodiment of subscriber station, such as MS 116, illustrated in FIG. 3 is for illustration only. Other embodiments of the wireless subscriber station could be used without departing from the scope of this disclosure.

MS 116 comprises one or more antennas 305, radio frequency (RF) transceiver 310, transmit (TX) processing circuitry 315, microphone 320, and receive (RX) processing circuitry 325. MS 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from one or more antennas 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via one or more antennas 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for channel sounding in beamformed massive MIMO systems as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications, including channel sounding in beamformed massive MIMO systems. The main processor 340 can operate the plurality of applications 362 based on OS program 361 or in response to a signal received from BS 102. Main processor 340 is also coupled to I/O interface 345. I/O interface 345 provides mobile station 116 with the ability to connect to other devices such as laptop computers and handheld computers. I/O interface 345 is the communication path between these accessories and main controller 340.

Main processor 340 is also coupled to keypad 350 and display unit 355. The operator of mobile station 116 uses keypad 350 to enter data into mobile station 116. Display 355 may be a liquid crystal display capable of rendering text and/or at least limited graphics from web sites. Alternate embodiments may use other types of displays.

Figure 4:
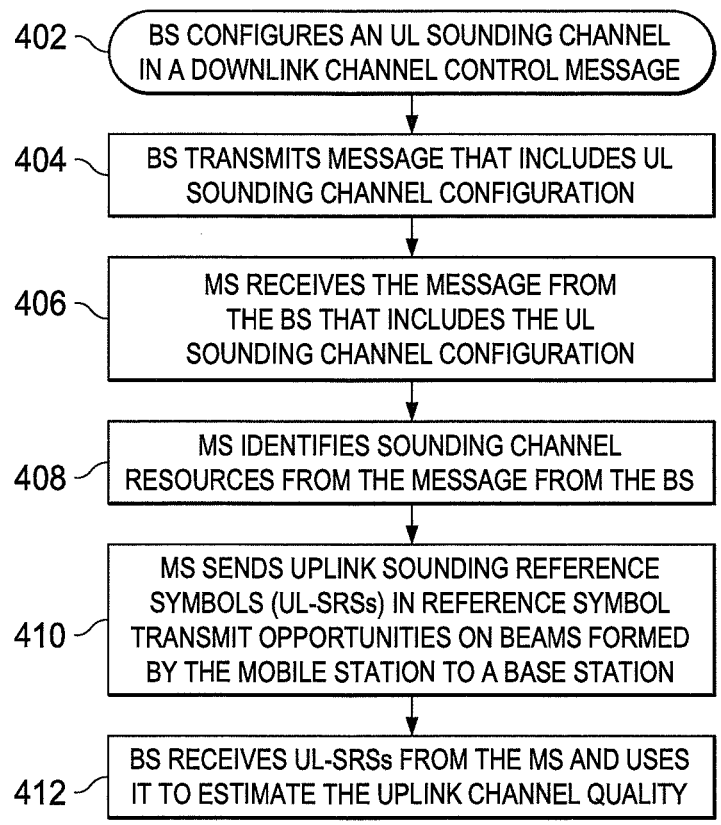
FIG. 4 illustrates a flow diagram for channel sounding in a communication system according to embodiments of the present disclosure.

FIG. 4 illustrates a flow diagram for channel sounding in a communication system according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

Uplink channel sounding is used for sensing channel quality of transmissions from a mobile station to a base station. Reference symbols known to both the base station and mobile station are placed in configured time-frequency resources and transmitted at known intervals to enable systematic channel sounding.

At 402, the base station (BS), such as BS 102, configures an uplink sounding channel (also referred to as a sounding channel), which in the case of an Orthogonal Frequency Division Multiple Access (OFDMA) based cellular system involves a set of sub-carriers and OFDM symbols for an MS, such as MS 116. In addition to indicating a configuration of physical resources, which include the subcarriers and OFDM symbols, BS 102 can indicate the periodicity, the multiplexing type, and other parameters for MS 116 to transmit via the uplink sounding channel. The configuration of the sounding channel configures the sounding channel with respect to one or more of reference symbol transmit opportunities (also referred to as sounding channel resources), slots, subframes, and frames used by the sounding channel. The configuration of the uplink sounding channel is by a downlink channel control message.

At 404, BS 102 transmits a message that includes an uplink sounding channel configuration. The configuration of the uplink sounding channel can be transmitted to stations 116 via a downlink channel control message by BS 102.

At 406, MS 116 receives a message from BS 102 that includes the uplink sounding channel configuration. The message can be a downlink channel control message sent by BS 102 and received by MS 116.

At 408, MS 116 identifies sounding channel resources from the message received from BS 102. The sounding channel resources are also referred to as resource elements or transmit opportunities of a slot of a subframe of a frame that is used for communication between MS 116 and BS 102.

At 410, MS 116 uses a sounding channel to send uplink sounding reference symbols in reference symbol transmit opportunities to BS 102. The sounding channel includes the reference symbol transmit opportunities in slots of subframes of frames used for communication with BS 102. The sounding channel also includes a configuration that configures the sounding channel with respect to one or more of the reference symbol transmit opportunities, slots, subframes, and frames.

At 412, BS 102 receives the UL-SRSs and processes them to quantify the channel quality on the uplink. This assessment of the uplink channel quality is used for scheduling uplink data transmissions. In time division duplex systems with calibrated antennas, the uplink channel quality can be translated to a downlink channel estimate. This downlink channel estimate can be used to schedule closed loop downlink closed loop multiple input, multiple output (MIMO) transmissions. Sounding RS transmissions also can be used for time and frequency synchronization.

Figure 5:
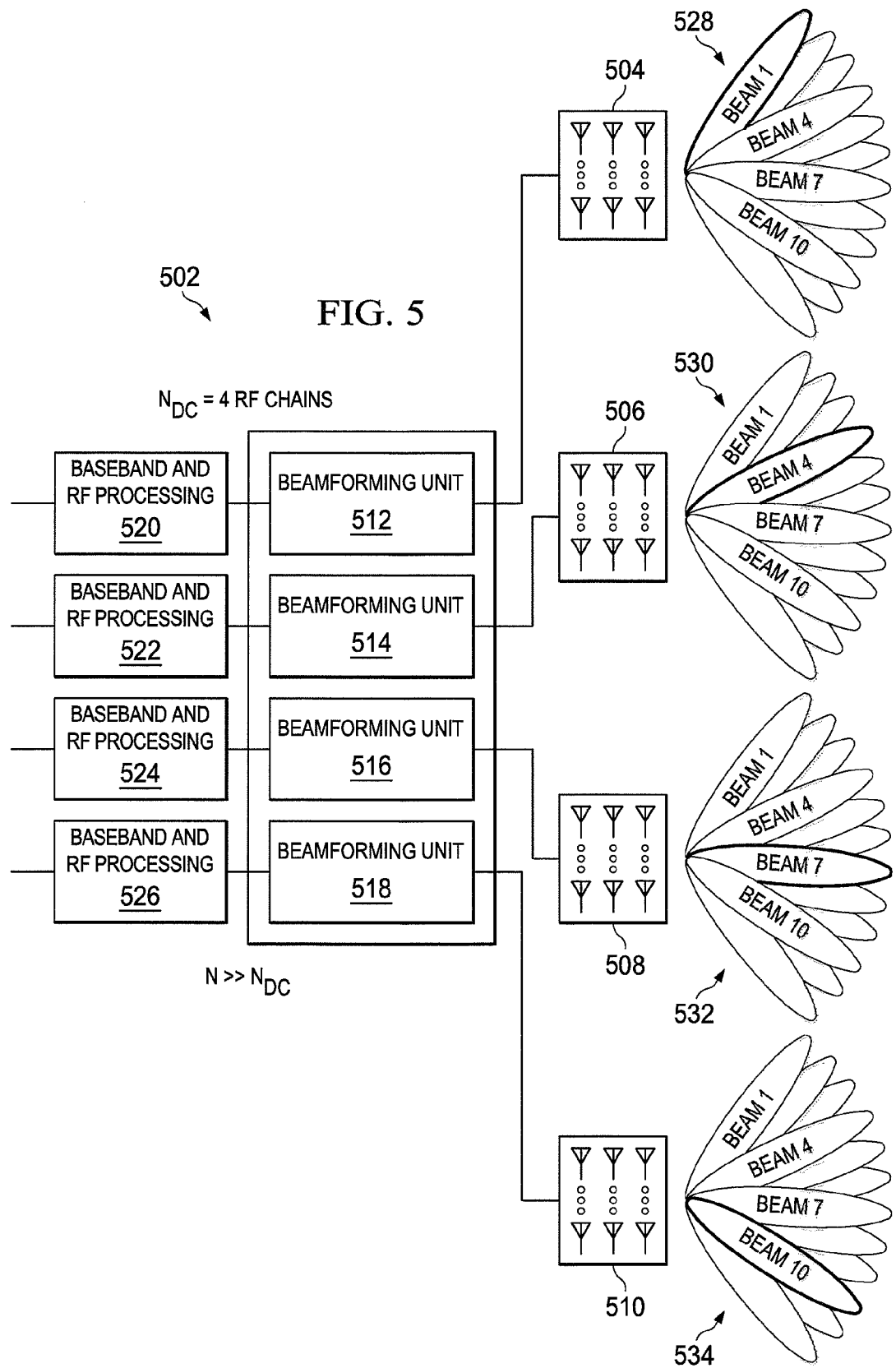
FIG. 5 illustrates a block diagram of a millimeter wave transmitter system according to embodiments of the present disclosure.

FIG. 5 illustrates a block diagram of a millimeter wave transmitter system 502 according to embodiments of the present disclosure. The embodiment of the millimeter wave transmitter system 502 shown in FIG. 5 is for illustration only. Other embodiments could be used without departing from the scope of this disclosure.

For a millimeter wave cellular system, the transmitter's (MS 116 or BS 102) numerous antennae are arranged as one of more arrays 504-510 and connected through different phase shifters, such as beam forming units 512-518, to the analog processing chain that has power amplifiers and other RF components in this pathway. The analog processing chain is preceded by the digital baseband chain, which contains an OFDMA processing pathway, such as transmit path 200 of FIG. 2A. The analog and digital baseband chains 520-526 are connected through a digital to analog converter at the transmitter. The receiver also has an antenna array, such as one or more of arrays 504-510, connected to an analog chain containing low noise amplifiers through phase shifters. The analog chain is connected to the digital processing chain through an analog to digital converter. There can be more than one digital baseband transmit and receive chains at the transmitter and receiver. Each of these digital base band chains can be connected to the same antenna array by using components that combine signals from multiple baseband chains or each base band chain can be connected to different antenna arrays. In the example shown in FIG. 5, the millimeter wave transmitter 502 contains four digital baseband chains and analog chains connected to respective antenna arrays.

Each antenna array 504-510 creates a respective plurality of spatial beams 528-534. The beams of the plurality of spatial beams 528-534 generated by the different antenna arrays 504-510 occupy the same space.

The digital and analog chain 520 sends its signal to beamforming unit 512, which sends the signal to antenna array 504, which transmits on one of plurality of beams 528. Digital and analog chain 522 sends its signal to beamforming unit 514, which sends the signal to antenna array 506, which transmits on beam four of plurality of beams 530. Digital and analog chain 524 sends its signal to beamforming unit 516, which sends the signal to antenna array 508, which transmits on beam seven of plurality of beams 532. Digital and analog chain 526 sends its signal to beamforming unit 518, which sends the signal to antenna array 510, which transmits on beam four of plurality of beams 534.

In 4G systems, the number of reference symbols required for transmission is directly proportional to the number of transmit antennae. Despite having a large number of antennae compared to 4G systems, millimeter wave systems do not require the number of reference symbols to be proportional to the number of antennae in the array. Instead, it depends on the number of different spatial beams that beamforming can support. Typically, the beamforming supports N spatial beams where N is typically much smaller than the number of antennae in the array. However, a fewer number of digital baseband chains that process the signal from the antenna places a processing constraint on the system. The number of digital baseband chains $N_{DC}$ determines the number of parallel processing the transmitter or receiver is capable of utilizing. In practical systems, $N_{DC}<N$, that is the number of digital baseband chains ($N_{DC}$) is less than the number of spatial beams (N) that can be supported. Thus, a large number of spatial beams can be supported by multiplexing them in time.

Figure 6:
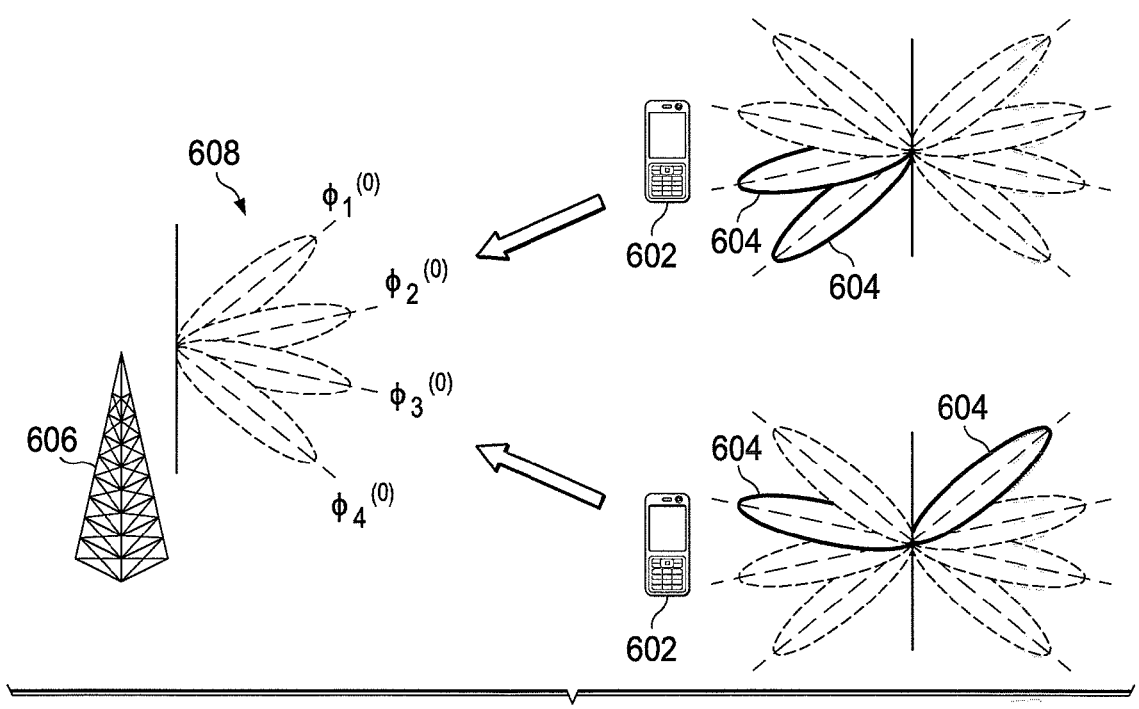
FIG. 6 illustrates transmission and reception of uplink sounding reference samples from mobile stations to a base station according to embodiments of the present disclosure.

FIG. 6 illustrates transmission and reception of uplink sounding reference samples from mobile stations to a base station according to embodiments of the present disclosure. The embodiment of the transmission and reception of uplink sounding reference samples shown in FIG. 6 is for illustration only. Other embodiments could be used without departing from the scope of this disclosure.

MS 116 and SS 115 transmit sounding reference symbols on pre-selected beams 604. The BS 102 receives and processes these signals via different beams 608 and computes a channel quality of the uplinks of MS 116 and SS 115. The BS 102 has $N_{DC}^{BS}$ number of digital baseband chains and can support $N_b^{BS}$ spatial beams in each digital chain. MS 116 has $N_{DC}^{MS}$ digital chains and transmits sounding reference symbols on $N_b^{MS,s}$ spatial beams that are a subset of the $N_b^{MS}$ spatial beams at MS 116.

MS 116 transmits a UL-SRS on a subset containing $N_b^{MS,s}$ transmit beams. To ensure that the received power for the UL-SRS is similar to that for uplink data, BS 102 receives the UL-SRS using receive beamforming with one of $N_b^{BS}$ beams at each time, where each beam is realized via an analog weight vector, at BS 102. Analog beamforming requires that a chosen weight vector or beam be applied over the entire OFDM symbol duration at both BS 102 and MS 116. Therefore, the number of OFDM symbols required to scan all pairs of transmit and receive analog beams is given by the product of the number ($N_b^{MS,s}$) of sounding beams at MS 116 and the number ($N_b^{BS}$) of receive beams at BS 102. The UL-SRS must be transmitted over $N_b^{MS,s} \times N_b^{BS}$ OFDM symbols, which are required to scan all transmit and receive analog beam pairs. Hence, the UL-SRS are not localized to a single OFDM symbol (single shot transmission) like 4G but need to span multiple OFDM symbols to enable scanning using different beams and analog weight vectors at both BS 102 and MS 116. Also, the UL-SRS for a given transmit beam at MS 116 needs to be repeated to enable BS 102 to receive it using all $N_b^{BS}$ beams.

BS 102, in configuring the UL-SRS for MS 116, can indicate a number ($N_b^{MS,s}$) of transmit beams that MS 116 should use to send the reference symbols, a number ($N_{SRS}^{REP}$) of times the UL-SRS corresponding to a specific transmit beam is to be repeated, a bandwidth of the SRS, a periodicity with which this sounding process is to be repeated, a timing offset in units of sub-frames from when the SRS is to be transmitted. An example UL-SRS configuration message to be sent via a downlink control channel that comprises one or more fields or indicators to configure a sounding channel is shown in the table below. Syntax fields with * indicate that these are items that are specified to accommodate analog beamforming and scanning for different transmit-receive beam pairs. Numbers preceded with "0b" indicate a number written in binary form, e.g., "0b010" is equivalent to decimal "2". Additionally, while sizes are indicated in the table, these sizes are for example purposes, and any size can be used.

| Syntax | Size (bits) | Notes |
| --- | --- | --- |
| UL_Sounding_Configuration_Command( ) { | — | — |
| Command type | 4 | Indicates that this command configures UL sounding |
| Sounding slot configuration* | 1 | Indicates if a UL-SRS slot is defined |
| If (Sounding slot configuration == 0) { | | |
| Sounding sub-frame indicator | 2 | Indicates a sounding sub-frame. Sub-frames carrying the sounding subframe are renumbered from zero |
| Sounding sub-band bitmap | Variable Max. DEF | FFT size dependent |
| If (multiplexingType == 0){ | | |
| Decimation offset d }else{ | 5 | Unique decimation offset |
| Cyclic time shift m } | 5 | Unique cyclic shift |
| Periodicity (p) | 3 | 0b000 = single command, not periodic or terminate periodicity, if no other parameter has changed. Otherwise repeat sounding once per $2^{p-1}$ frames, where p is the decimal value of the periodicity field |
| Number of transmit beams for UL-SRS transmission ($N_b^{MS,s}$)* | 2 | 0b00 - not allowed. Decimal value of the field is used. |
| Number of repetitions of the UL-SRS per transmission beam ($N_{rep}^{SRS}$)* | Variable Max. DEF | The decimal value of the field indicates a number of times the UL-SRS corresponding to an transmit beam is to be repeated |
| Power boosting | 1 | 0b0: no power boosting 0b1: 3 dB power boosting |
| Padding } | Variable | |

Figure 7:
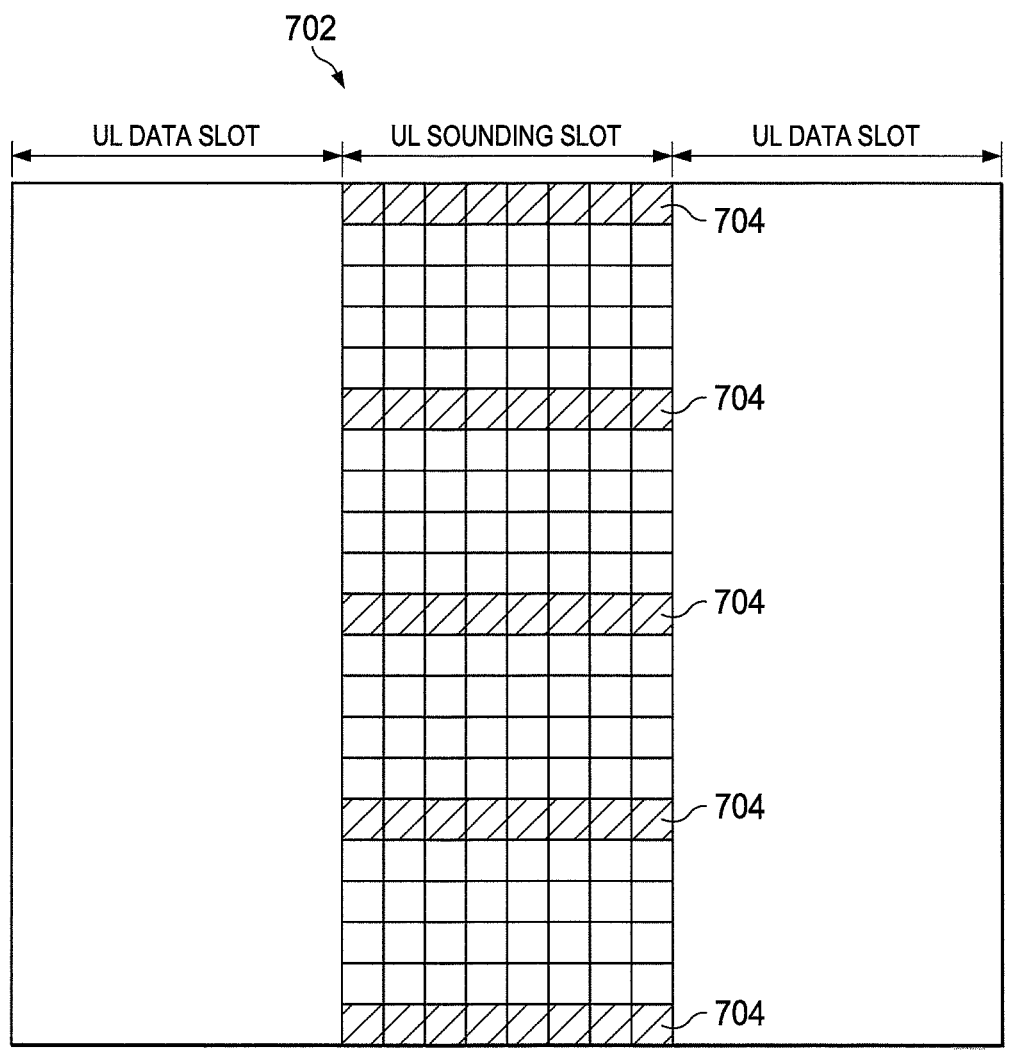
FIG. 7 illustrates an uplink sounding slot containing uplink sounding reference symbols according to embodiments of the present disclosure.

FIG. 7 illustrates an uplink sounding slot 702 containing an uplink sounding reference symbol (UL-SRS) 704 according to embodiments of the present disclosure. The embodiment of the uplink sounding slot 702 shown in FIG. 7 is for illustration only. Other embodiments could be used without departing from the scope of this disclosure.

In certain embodiments, BS 102 configures the uplink (UL) sounding slot 702 to be in the uplink subframe. The UL sounding slot 702 contains eight OFDM symbols, including UL-SRS 704, all of which carry an UL-SRS to enable scanning using different transmit-receive beam pairs. A sounding channel configured as a slot may enable MS 116 to repeat and transmit all the beams selected for UL-SRS transmission.

The number of OFDM symbols in the sounding slot 702 and its location in the UL subframe is specified, derivable, or signaled in a system wide configuration message. BS 102 schedules MS 116 (and/or SS 115) to transmit on the UL sounding slot 702 by transmitting an MS specific UL sounding configuration message in which the sounding slot configuration field is set to "1". The UL sounding configuration message also identifies the sounding slot configuration, number of transmit beams for UL-SRS transmission, and the number of repetitions of the UL-SRS per transmission beam in the UL-SRS configuration message. From the UL sounding configuration message MS 116 will be able to identify the configuration and transmission strategy for UL-SRSs.

In one mode of operation, the UL sounding slot 702 can be configured such that the number of UL-SRSs that MS 116 needs to transmit, i.e., $N_b^{MS,s} \times N_{rep}^{SRS}$ equals the number of OFDM symbols in the UL sounding slot 702. Hence, BS 102 can choose the parameters $N_b^{MS,s}$ and $N_{rep}^{SRS}$ to fit the duration of the UL sounding slot 702. The duration of the UL sounding slot 702 can be configured to be (1) the same duration as an uplink data slot, (2) an integral multiple of the uplink data slot, or (3) any fraction of the uplink data slot. The UL sounding slot 702 comprises eight OFDM symbols as an example, and could comprise more or fewer symbols.

In another mode of operation, the parameters $N_b^{MS,s}$ and $N_{rep}^{SRS}$ are indicated in the configuration message and the configuration of the UL sounding slot 702 in a sub-frame is indicated separately. If the number of UL-SRSs that MS 116 needs to transmit, i.e., $N_b^{MS,s} \times N_{rep}^{SRS}$ exceeds the number of symbols rep in one UL sounding slot, then the MS 116 can use consecutive sounding slots that can occur in the same or different sub-frames until all UL-SRSs are transmitted.

In configuring a UL-SRS channel for MS 116, BS 102 can select to not indicate its receive beamforming strategy to MS 116. As an example, BS 102 can select to not indicate the number of digital baseband chains at BS 102 ($N_{DC}^{BS}$) and the number of analog beams for each of the digital baseband chains. This allows BS 102 to dynamically configure its receive beamforming strategy in a way that is transparent to MS 116 and avoid overhead signaling.

When UL sounding slot 702 is configured in the subframe and the sounding slot configuration value of a UL-SRS configuration message is set to "1", then MS 116 transmits its UL-SRS in the symbols of the UL sounding slot 702. The number of transmit beams that are to be used for UL-SRS transmission ($N_b^{MS,s}$), multiplexing type and the number of repetitions of the UL-SRS per transmit beam ($N_{rep}^{SRS}$) both determine how the UL-SRS are to be placed in the symbol. As an example, the number of transmit beams for UL-SRS transmission $N_b^{MS,s}$=0b10 (decimal value "2"), the multiplexing type is set to "0" indicating decimation, the decimation offset equals zero, and the number of repetitions of the UL-SRS per transmission beam $N_{rep}^{SRS}$=0b100 (decimal value "4"). For this sounding configuration, MS 116 selects two beams for transmitting UL-SRS and can use at least two strategies for performing the required number of repetitions, as discussed in conjunction with FIG. 8.

Figure 8:
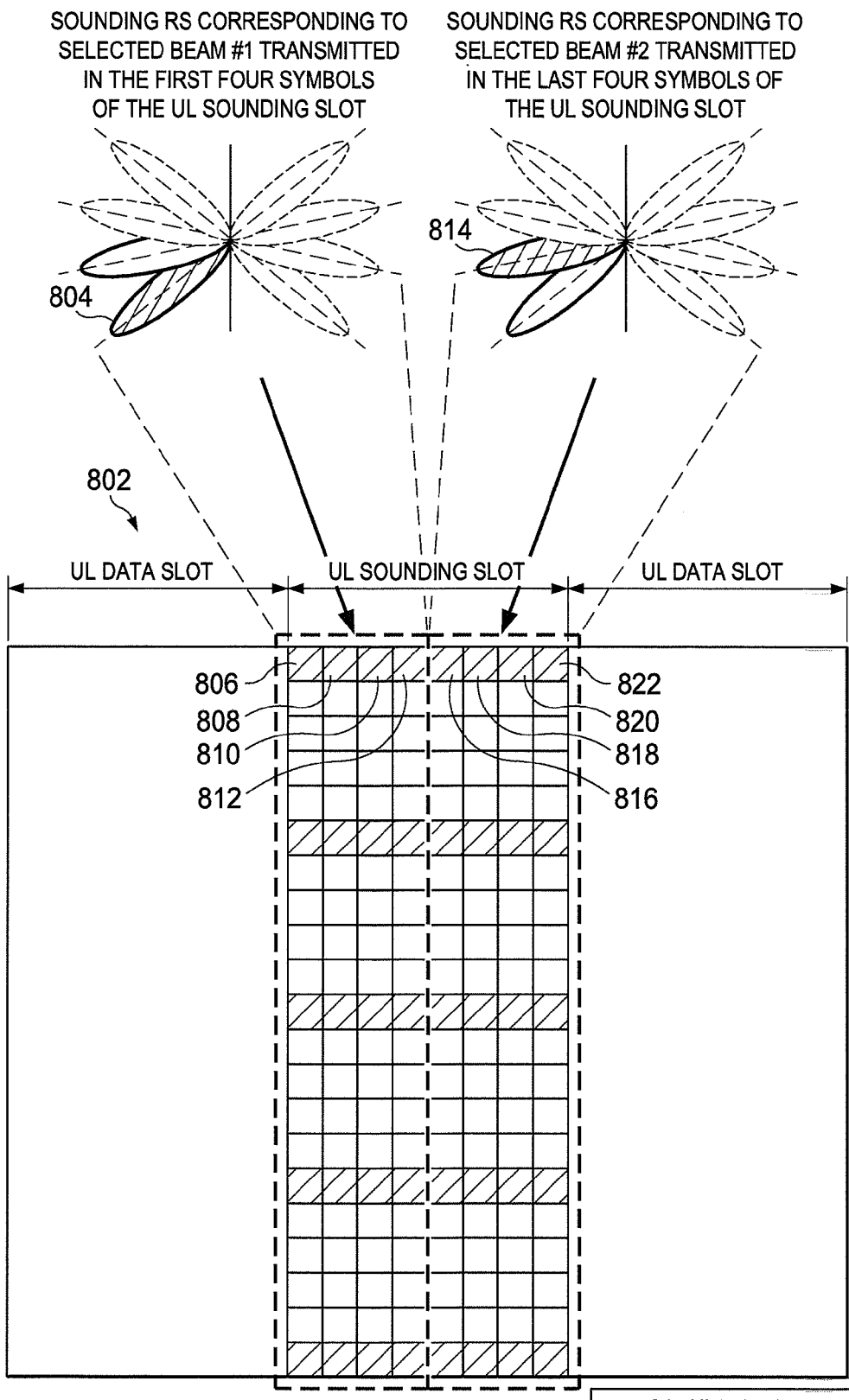
FIG. 8 illustrates an uplink sounding slot including reference symbol repetition using a first strategy i according to embodiments of the present disclosure.

FIG. 8 illustrates an uplink (UL) sounding slot 802 including reference symbol repetition using a first strategy according to embodiments of the present disclosure. The embodiment of the UL sounding slot 802 shown in FIG. 8 is for illustration only. Other embodiments could be used without departing from the scope of this disclosure.

In certain embodiments, MS 116 places an UL-SRS for the first selected beam 804 in the first OFDM symbol 806 of the UL sounding slot 802 and repeats the UL-SRS for the first selected beam in the next three symbols 808-812 of the UL sounding slot 802 (total repetition=4).

MS 116 then places the UL-SRS for the second selected beam 814 on the $5^{th}$ OFDM symbol 816 of the UL sounding slot and repeats them the $6^{th}$, $7^{th}$, and $8^{th}$ OFDM symbols 818-822 of the sounding slot 802.

Any repetition scheme may be used. As another example for the same configuration, the $N_b^{MS,s}=2$ beams on to an uplink sounding slot made of eight symbols with $N_{rep}^{SRS}=4$ repetition can be mapped using an alternative mode. MS 116 can transmit on a first selected beam in a first OFDM symbol and then on a second selected beam in a second OFDM symbol and then repeat this transmission pattern until $N_{REP}^{SRS}=4$ repetitions for each beam are transmitted. Hence, the selected beams can be alternated with respect to consecutive symbols.

Figure 9A:
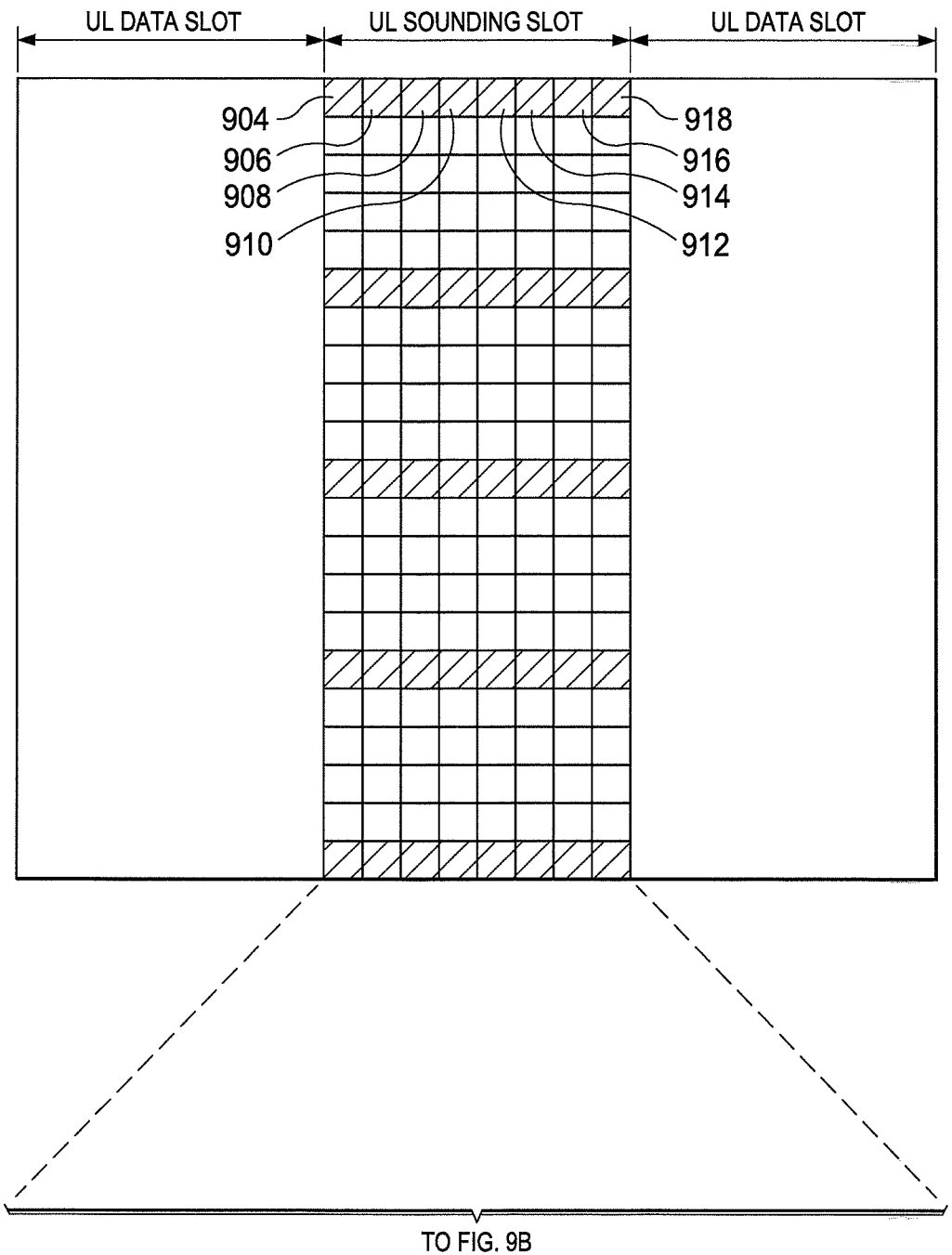
FIGS. 9A and 9B illustrate transmit and receive beamforming according to embodiments of the present disclosure.
Figure 9B:
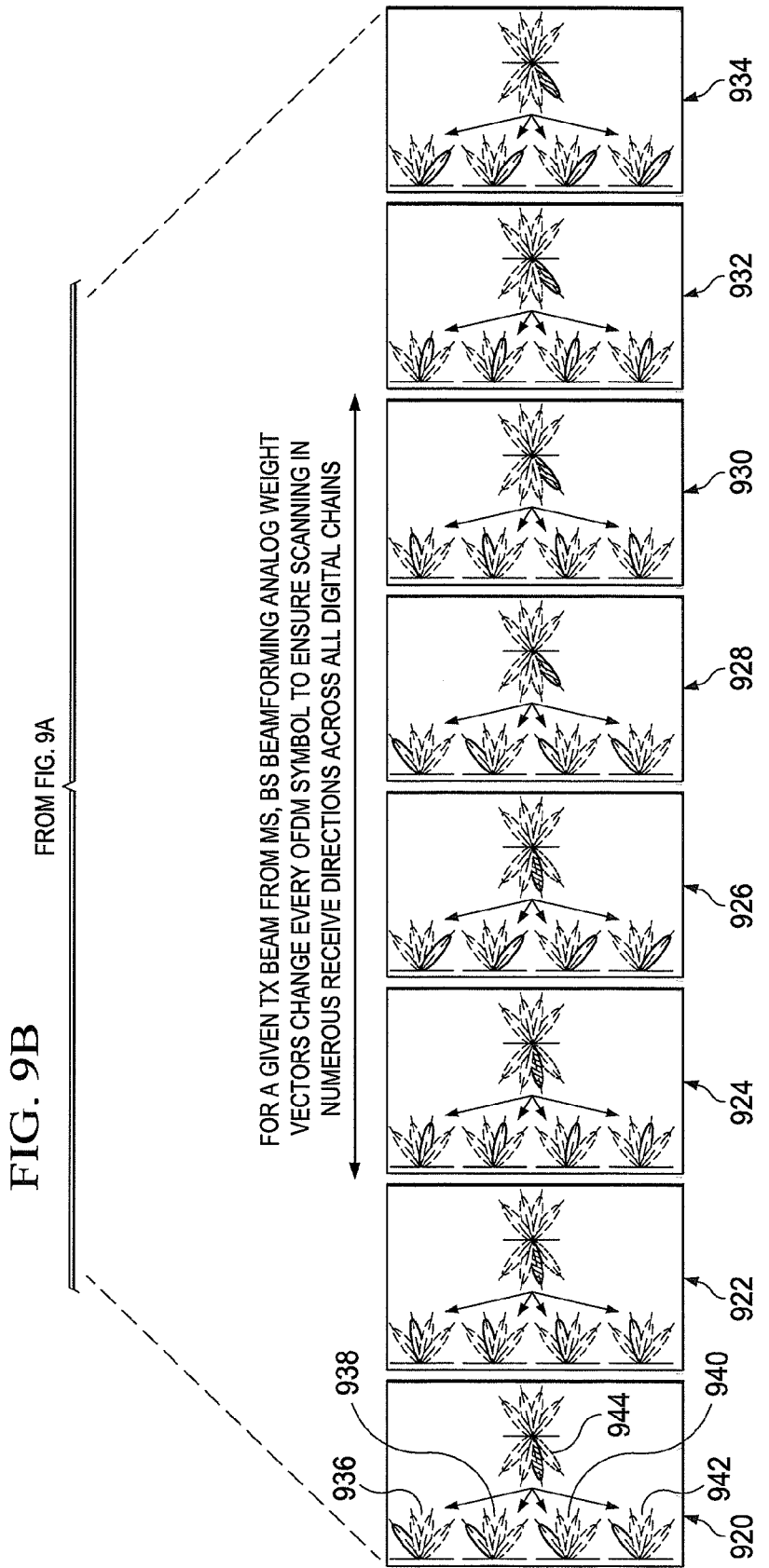

FIG. 9 illustrates transmit and receive beamforming according to embodiments of the present disclosure. The repetition of the SRS corresponding to a given transmit beam from MS 116 enables BS 102 to scan across multiple receive directions using $N_b^{MS,s}$ beams or analog weight vectors. For each transmission of the UL-SRS from a specific transmit beam of MS 116, BS 102 uses one of the $N_b^{BS}$ analog weight vectors on all four digital baseband chains to receive from a specific direction. This receive direction is changed from one symbol to the next, as shown in FIG. 9. Once all $N_b^{BS}$ beams are scanned, then the transmit beam forming at MS 116 moves to the next selected beam and receive beamforming procedure at BS 102 is repeated again.

FIG. 9 depicts a beam diagram 920-934 for each respective symbol 904-918 of an uplink sounding slot 902. In beam diagram 920, a first selected beam 936 of a first digital baseband chain of BS 102 is the same as a second selected beam 938 of a second digital baseband chain of BS 102, a third selected beam 940 of a third digital baseband chain of BS 102, and a fourth selected beam 942 of a fourth digital baseband chain of BS 102. Each digital chain of BS 102 receives the UL-SRS using a same selected beam of BS 102 sent via a first selected beam 944 of MS 116.

In successive beam diagrams 920-926, a different beam of BS 102 is selected to be used by each of the four digital chains of BS 102 to receive from a first selected beam of MS 116. In successive beam diagrams 928-934, a different beam of BS 102 is selected to be used by each of the four digital chains of BS 102 to receive from a second selected beam of MS 116.

BS 102 can configure other MSs, such as SS 114 and SS 115, it is serving to use different sounding resources with different parameters in a same uplink sounding slot. Note that the specific examples used for the illustration are for exemplary purposes. Other values and configurations may be used without deviating from the scope of this invention. Also, the receive beamforming procedure at BS 102 need not be signaled to MS 116. BS 102 can choose a receive beamforming strategy that maximizes the uplink throughput for the MSs, such as MS 116, scheduled in an UL sounding slot and the beam forming strategy of BS 102 can change after a message configuring the sounding channel 16 to be used by SS has already been sent to MS 116.

Figure 10:
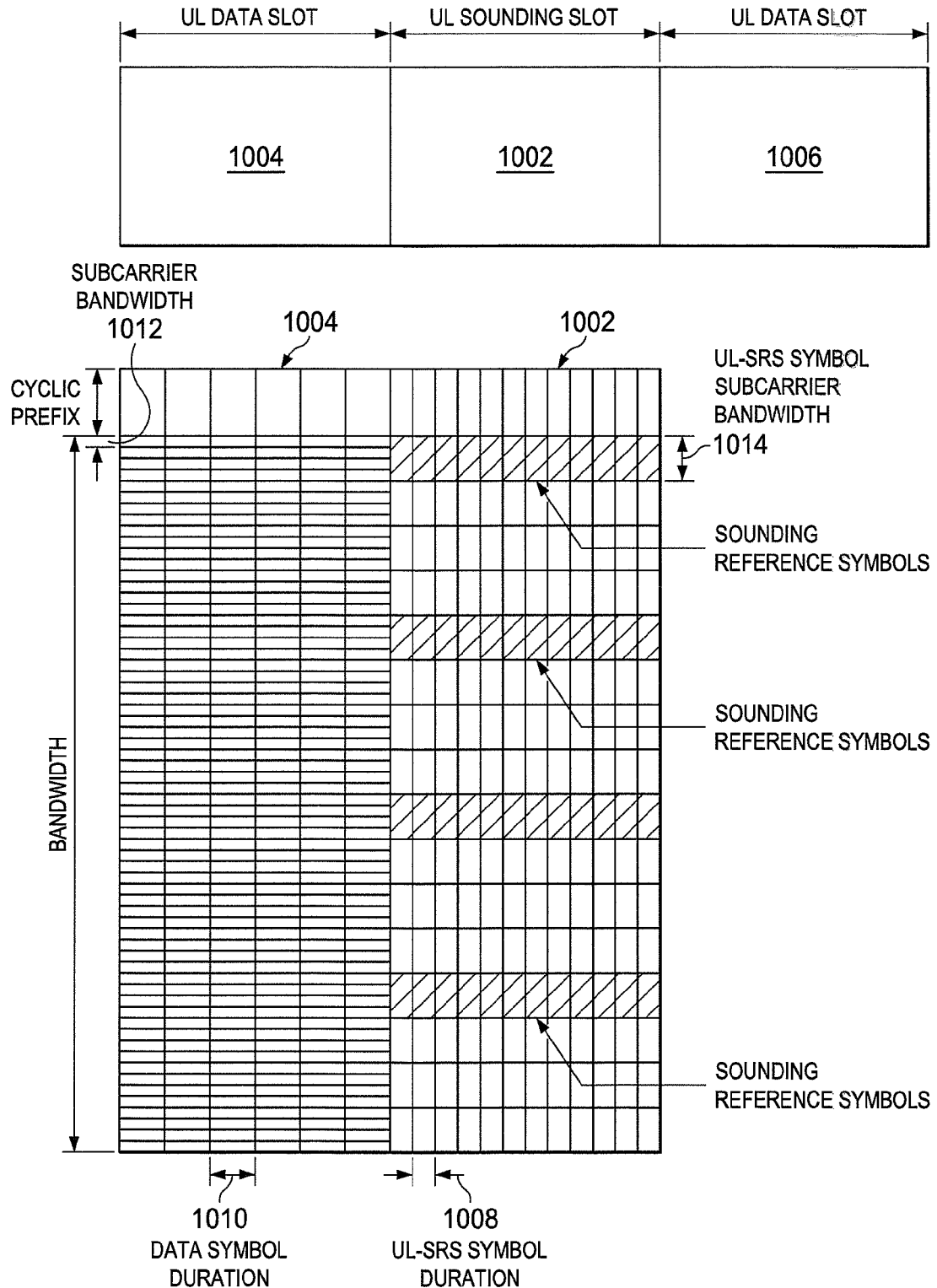
FIG. 10 illustrates an uplink sounding slot comprising shorter OFDM symbols as compared to symbols of a data slot according to embodiments of the present disclosure.

FIG. 10 illustrates an uplink (UL) sounding slot 1002 juxtaposed between uplink data slots 1004 and 1006 according to embodiments of the present disclosure. The embodiment of the UL sounding slot 1002 shown in FIG. 10 is for illustration only. Other embodiments could be used without departing from the scope of the present disclosure.

The UL sounding slot 1002 includes OFDM symbols with a shorter duration as compared to symbols of UL data slot 1004. The uplink sounding slot 1002 can use OFDM symbols with a duration 1008 that is shorter than a duration 1010 that is used for symbols in UL data slot 1004. The shorter duration 1008 OFDM symbol can be implemented by changing an IFFT size while keeping the sampling frequency constant in the OFDM signal processing pathway at the transmitter or by increasing the sampling frequency while keeping the IFFT size the same at the transmitter for UL-SRS symbols. Shortening the duration increases the subcarrier bandwidth by an amount proportional to change in the IFFT size or the sampling frequency. The shorter duration for the OFDM symbols would enable the transmitter to insert more OFDM symbols that carry UL-SRS for the same slot duration. The extent to which the OFDM symbols have to be shortened can be specified as a fixed quantity or be dynamically signaled in a system wide configuration message or an MS specific configuration message.

Figure 11:
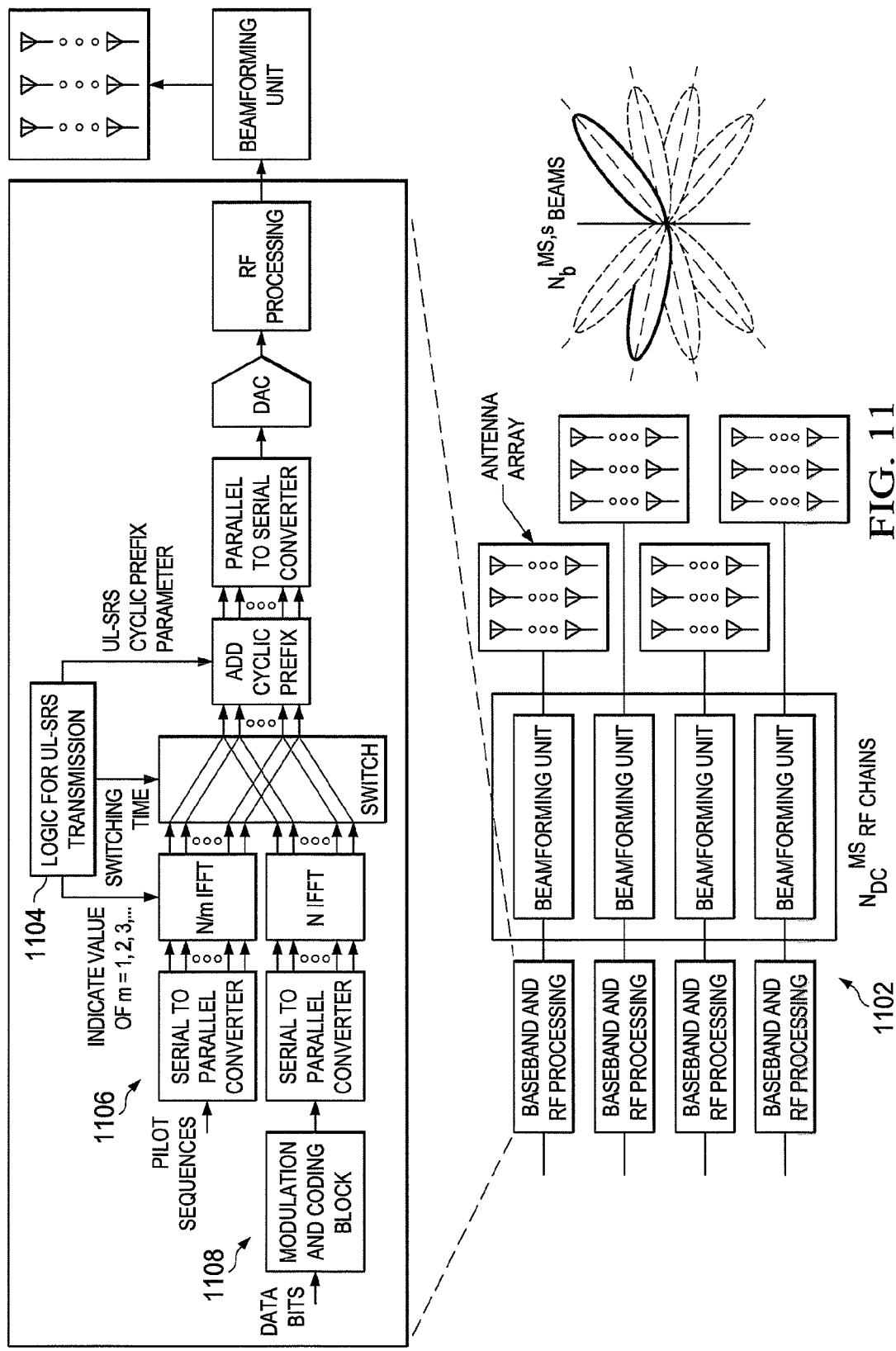
FIG. 11 illustrates a diagram of an apparatus for creating a sounding slot with symbols of a different duration than a data slot according to embodiments of the present disclosure.

FIG. 11 illustrates a diagram of an apparatus for creating a sounding slot with symbols of a different duration than a data slot according to embodiments of the present disclosure. The embodiment of the apparatus shown in FIG. 11 is for illustration only. Other embodiments could be used without departing from the scope of this disclosure.

A transmitting apparatus 1102 multiplexes UL-SRSs on short OFDM symbols with longer data OFDM symbols at MS 116. Logic 1104 for UL-SRS transmission translates the system requirement to a configuration of the IFFT size in the pilot sequence processing pathway 1106. The pilot sequences mapped to frequency resources are processed using an IFFT that is different from that one on a data signal pathway 1108. The OFDM symbols thus processed are transmitted sequentially for the duration of the UL sounding slot.

Once an UL sounding slot has been configured to include short OFDM symbols, MS 116 uses the UL-Sounding Configuration message received from BS 102 to identify the placement, multiplexing and repetition of UL-SRSs to enable systematic scanning across different transmit-receive beam pairs.

FIG. 12 illustrates different configurations for multiplexing UL-SRSs in a subframe according to embodiments of the present disclosure. A frame can contain multiple homogeneous or heterogeneous configurations for sounding resource channels. A frame 1210 includes three configurations 1204-1208 of sounding channels. UL-SRSs 1202 can be multiplexed with symbols for data by reserving one or more OFDM symbols on an UL data slot of a subframe for SRS transmission. A configuration 1206 uses a sounding slot where all OFDM symbols in the slot will transmit SRS and configurations 1204 and 1208 allow for a configurable number of OFDM symbols in an UL data slot to transmit UL-SRSs 1202. Configurations 1204 and 1208 allow UL-SRSs to be multiplexed with data subcarriers thus saving reference symbol overhead when compared to a slot configuration.

UL-SRSs 1202 can be multiplexed with data using different configurations 1204-1208 and a same frame and in a same subframe. In addition to the configuration of the uplink sounding slot 1206, BS 102 can signal the use of a first configuration 1204, where UL-SRSs 1202 are multiplexed with data and using the last OFDM symbol in the uplink data slot where all symbols of the uplink data slot use the same IFFT size and the same subcarrier bandwidth.

Configuration 1208 configures the UL-SRS symbols to be multiplexed in what would be a last data symbol of an uplink data slot. The use a shorter OFDM symbols for the UL-SRSs allows for UL-SRSs corresponding to multiple beam pairs to be used in the same space as a data symbol. The shorter OFDM symbols that carry UL-SRSs use a different IFFT size or sampling frequency than that used for the OFDM symbols that carry data. The use of short OFDM symbol as in configuration 1208 allows scanning of different transmit-receive beam pairs in the same duration of a regular OFDM symbol. Many more configurations can be constructed in addition to the ones illustrated in FIG. 12. These include using a first symbol of an UL data slot and frequency multiplexing of UL-SRS where certain resource blocks are reserved for transmitting UL-SRS from MSs and having the choice of these resource blocks vary with time.

BS 102 signals which of the combination of configurations are used for UL-SRS multiplexing in a sub-frame, their position in the sub-frame and the periodicity for the signaled combination of configurations using a system configuration message. MS 116 uses the system configuration message to first identify the sub-frames where UL-SRSs are to be transmitted and then uses an UL-sounding command A-MAP IE to identify the precise configuration it will use to transmit UL-SRSs to BS 102.

In additional or alternative embodiments, BS 102 can use only certain combination of configurations in a sub-frame. For example, BS 102 can configure an UL sounding slot in accordance with configuration 1206 and BS 102 can also configure the last OFDM symbol of a UL data slot in accordance with configuration 1204. Each configuration can be on different UL slots of a given subframe of a frame. Additional alternatives can have BS 102 to use a limited set of its available configurations in a given sub-frame.

In additional or alternative embodiments, BS 102 can configure uplink sounding channel using different configurations based on a configuration of a sounding channel in one or more neighboring BSs. A configuration of a sounding channel of a neighboring BS, such as BS 103, can be received as a message and can be exchanged over a dedicated interface between BSs, such as an X2 interface. BS 102 also can send its sounding channel configuration with the neighboring BSs over an interface, such as the dedicated X2 interface.

In additional or alternative embodiments, when a combination of UL-SRS multiplexing configurations are used in uplink sub-frame, MS 116 uses an UL Sounding configuration message received from BS 102 to identify the multiplexing configuration that MS 116 will use to transmit the UL-SRSs to BS 102. A Sounding Slot Configuration field in an UL Sounding Configuration may indicate to MS 116 if an UL-SRS is to be transmitted on an UL sounding slot or be multiplexed along with data in a last OFDM symbol of an UL-data slot. For example, if the Sounding Slot Configuration field is set to 1, then MS 116 can use an UL sounding slot placed in an uplink slot of a subframe to transmit UL-SRSs. If the Sounding Slot Configuration field is set to zero, then MS 116 can multiplex at least one UL-SRS along with data in an uplink slot of a subframe. A location of the UL sounding slot and the slot in which the UL-SRS is to be multiplexed with data can also be signaled to all MSs using a system wide configuration message received by all MSs served by BS 102. If multiple sounding slots or sounding configurations are used in a sub-frame, then the UL sounding slot configuration field can be enlarged to accommodate multiple bits where each tuple of bits index a particular sounding slot in the sub-frame.

Figure 13A:
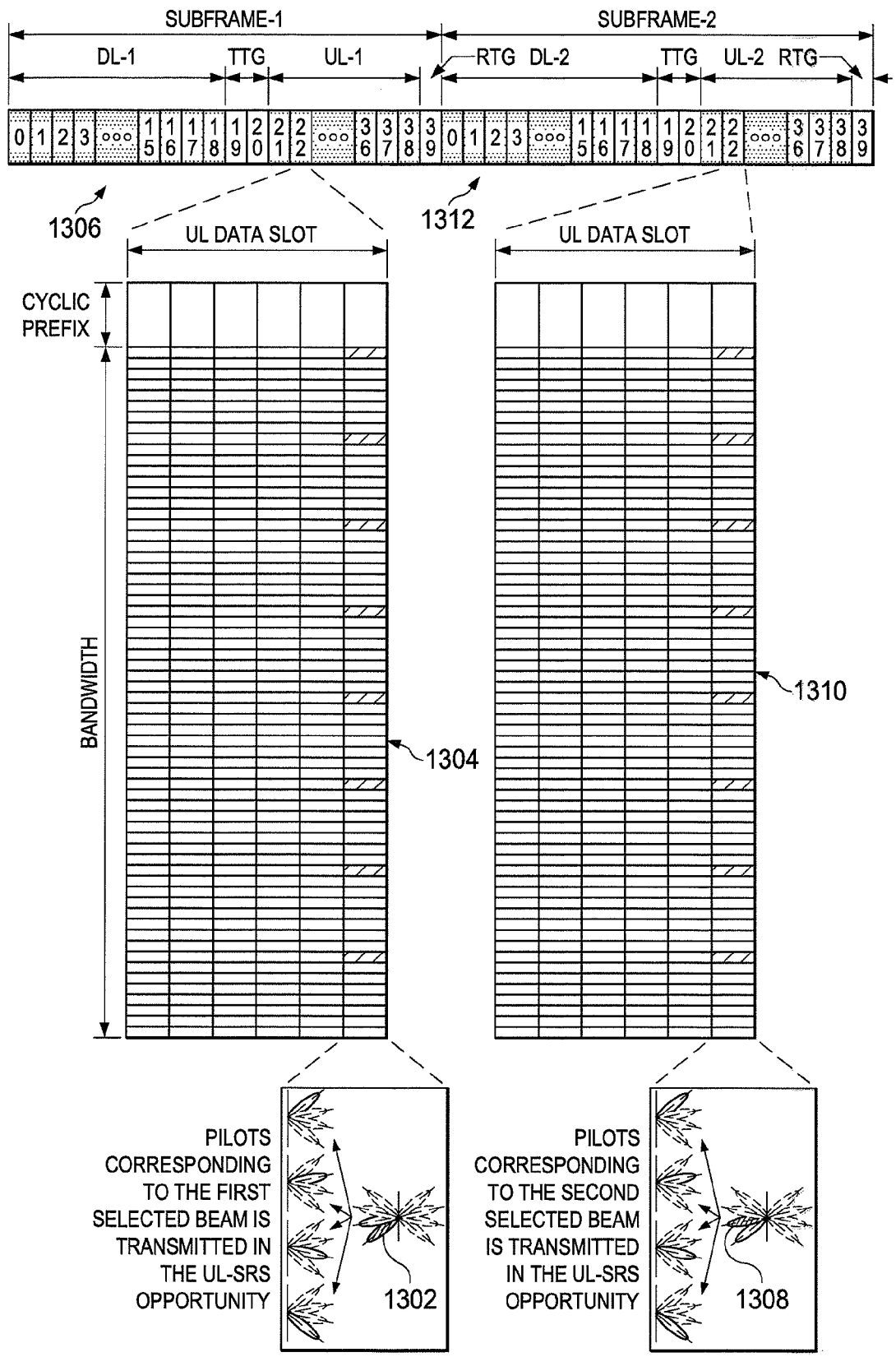

FIG. 13 illustrates UL-SRS transmission for multiple MS beams on multiple subframes according to embodiments of the present disclosure. The embodiment of the UL-SRS transmission shown in FIG. 13 is for illustration only. Other embodiments could be used without departing from the scope of this disclosure.

BS 102 can configure MS 116 to use a combination of configuration 1204 and configuration 1208 or if BS 102 sets a Sounding Slot Configuration field to zero in an UL Sounding Configuration message, MS 116 will transmit the UL-SRSs in multiple successive instances (slots/sub-frames) where UL-SRSs can be multiplexed. This enables scanning multiple transmit and receive beam pairs.

For example, a first configuration, such as configuration 1204 of FIG. 12, is allowed on UL slot 22 in every subframe and a second configuration, such as configuration 1206 of FIG. 12, that uses an uplink sounding slot, is allowed on slot 38 set to repeat every subframe. Under such a setting, MS 116, whose UL sounding configuration message received from BS 102 contains Sounding Slot Configuration=0, Periodicity (p)=0b100, Number of transmit beams for UL-SRS transmission ($N_b^{MS,s}$)=2 and Number of repetitions of the UL-SRS per transmission beam ($N_{rep}^{SRS}$)=1, will configure to transmit UL-SRS for a first transmit beam 1302 once in the first UL-SRS transmit opportunity 1304 in a first subframe 1306 and then the UL-SRS for a second transmit beam 1308 on a next UL-SRS transmit opportunity 1310 in a second or succeeding subframe 1312. Once MS 116 has transmitted all the UL-SRS in succeeding SRS multiplexing instances, MS 116 will use the periodicity parameter to identify a subframe of a succeeding frame for the next round of UL-SRS transmission. The periodicity parameter is sufficiently large so that the number of SRS transmission opportunities needed to transmit all the required repetitions of the UL-SRS can be completed.

Transmitting UL-SRSs over multiple and successive sub-frames can occur even when a sounding channel is configured to use an UL sounding slot. When the number of beams to be sounded ($N_b^{MS,s}$) and the number of repetitions per beam ($N_{REP}^{SRS}$) are set so as to require more symbols than there are in a UL-sounding slot, MS 116 will transmit the UL-sounding on successive SRS transmission opportunities till all UL-SRS transmissions set by a configuration are complete.

In alternative or additional embodiments of the present disclosure, an UL-SRS transmission can be configured such that MS 116 transmits the SRS corresponding to selected beams one at a time. The UL-SRS corresponding to a selected beam is transmitted from a digital chain. In case of MS 116 equipped with $N_{DC}^{MS}>1$ digital chains, MS 116 selects transmit beams for UL-SRSs for each of the $N_{DC}^{MS}$ digital chains separately. For each of its digital chains MS 116 transmits an UL-SRS corresponding to the chosen beam via that digital chain. The UL-SRS corresponding to a second digital chain or other digital chains can be transmitted on the same sounding opportunity separated by one or a combination of (1) a different cyclic shift index when multiplexing of SRS is code separated and (2) a different frequency offset when the SRSs are decimation separable. The multiple cyclic shift indices or the frequency shift offsets are computed based on the assigned MS specific cyclic shift or frequency shift indicated in an UL Sounding Configuration message. MS 116 can use consecutive cyclic shift indices or frequency shift offsets to transmit SRS from all its digital chains or can choose cyclic shift indices or frequency shift offsets based on a functional mapping using several parameters including the number of digital chains ($N_{DC}^{MS}$), the MS ID, etc., to identify the cyclic shift index or frequency shift offset used for transmission.

In additional or alternative embodiments in accordance with the present disclosure, an UL-SRS transmission may be configured such that MS 116 transmits the SRS corresponding to a first selected beam for a first digital chain of MS 116 in the first sounding opportunity and completes all the repeated SRSs for first selected beam before moving on to a second or next digital chain of MS 116. This would take $N_{SRS}^{REP}$ number of sounding opportunities for the first selected beam.

MS 116 then transmits with the first selected beam from the second digital chain in the $N_{SRS}^{REP}+1$th sounding opportunity and completes the repeated SRS for that selected beam in the second digital chain. This procedure is repeated until all the first selected beams from all the digital chains have been transmitted as per settings in a configuration message.

At the $N_{DC}^{MS} \times N_{SRS}^{REP}+1$th sounding opportunity, an SRS for the second selected beam via the first digital chain is transmitted until all of its repetitions are complete. MS 116 repeats the SRS transmission for different selected beams from different digital chains and repeats them as per the AO format in successive SRS opportunities until all the required SRS are transmitted, which will include $N_{DC}^{MS} \times N_{SRS}^{REP} \times N_{b}^{MS,s}$ repetitions, i.e., a repetition for each digital chain ($N_{DC}^{MS}$), each repetition ($N_{SRS}^{REP}$) for beams of BS 102, and each repetition for beams ($N_{b}^{MS,s}$) of MS 116.

Figure 14:
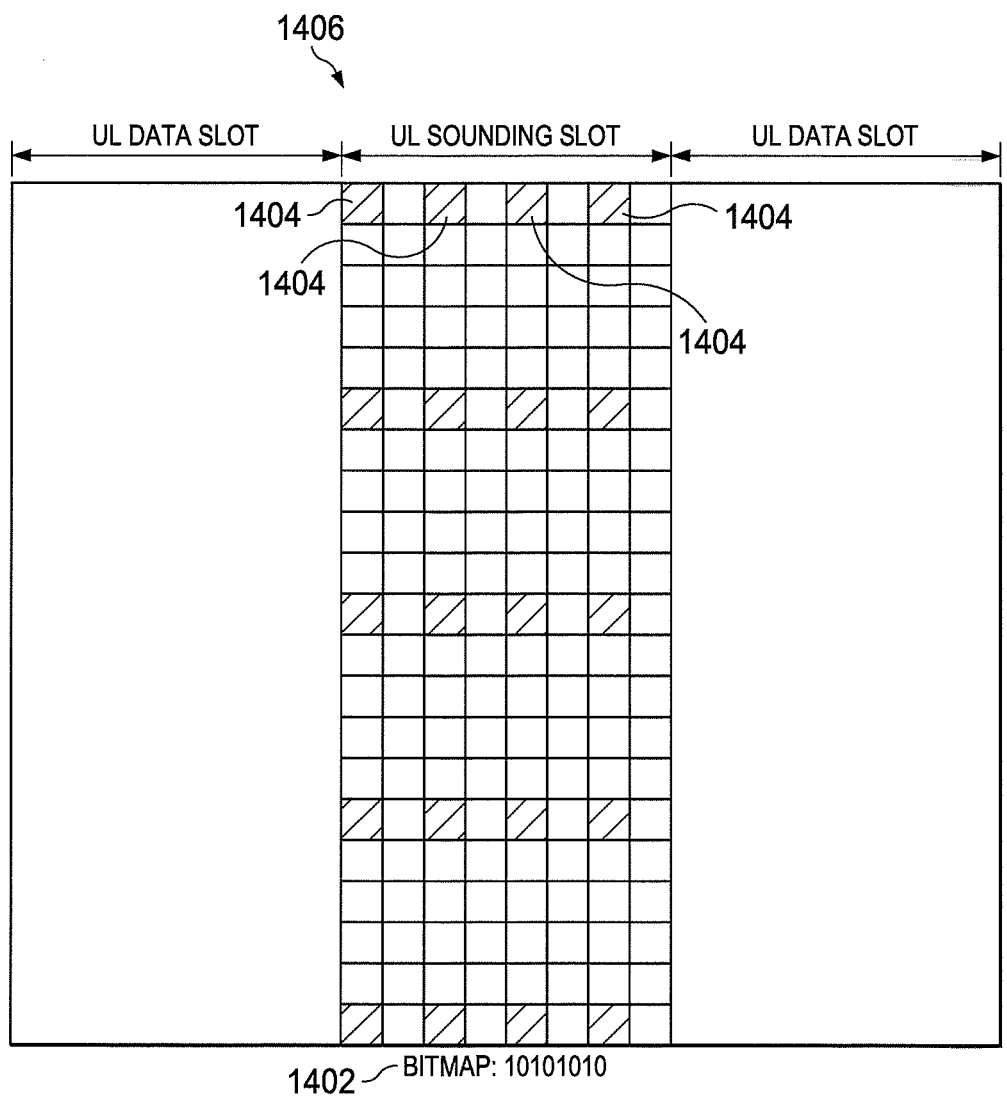
FIG. 14 illustrates a configuration for a UL sounding channel where transmit opportunities are identified via a bitmap according to embodiments of the present disclosure.

FIG. 14 illustrates a configuration for an UL sounding channel where transmit opportunities are identified via a bitmap according to embodiments of the present disclosure.

BS 102 can indicate specific sounding opportunities that are to be used for transmitting SRS. For example, when the sounding opportunity is configured as a slot—either a data slot or a sounding slot—made up of consecutive OFDM symbols, BS 102 can specify the symbols in the slot on which the UL-SRS are to be transmitted in a UL sounding configuration message.

This specification can come in the form of a bitmap of length equal to the number of symbols in the slot to be controlled by the bitmap. If the slot has eight symbols, the bitmap can be eight bits. Alternatively, if the slot has greater than eight symbols, the bitmap of eight bits can be associated with certain symbols in the slot. For example, the first four bits may be associated with the first four symbols of the slot and the last four bits may be associated with the last four symbols the slot. As another example, the bits of the bitmap can be associated with consecutive symbols at a start or at an end of the slot.

In certain embodiments, for each bit of the bitmap, a '1' in the location of the symbol in the slot indicates that a SRS is to be transmitted in that symbol and a '0' indicates that no SRS be transmitted in the symbol.

An example of the bitmap configuration is shown in FIG. 14 to illustrate how a bitmap 1402 indicates symbols 1404 are to be used for SRS transmission in the slot 1406. The bitmap identifying SRS transmission can be indicated in an UL sounding configuration message along with the other parameters that configure UL-SRS transmission.

Figure 15:
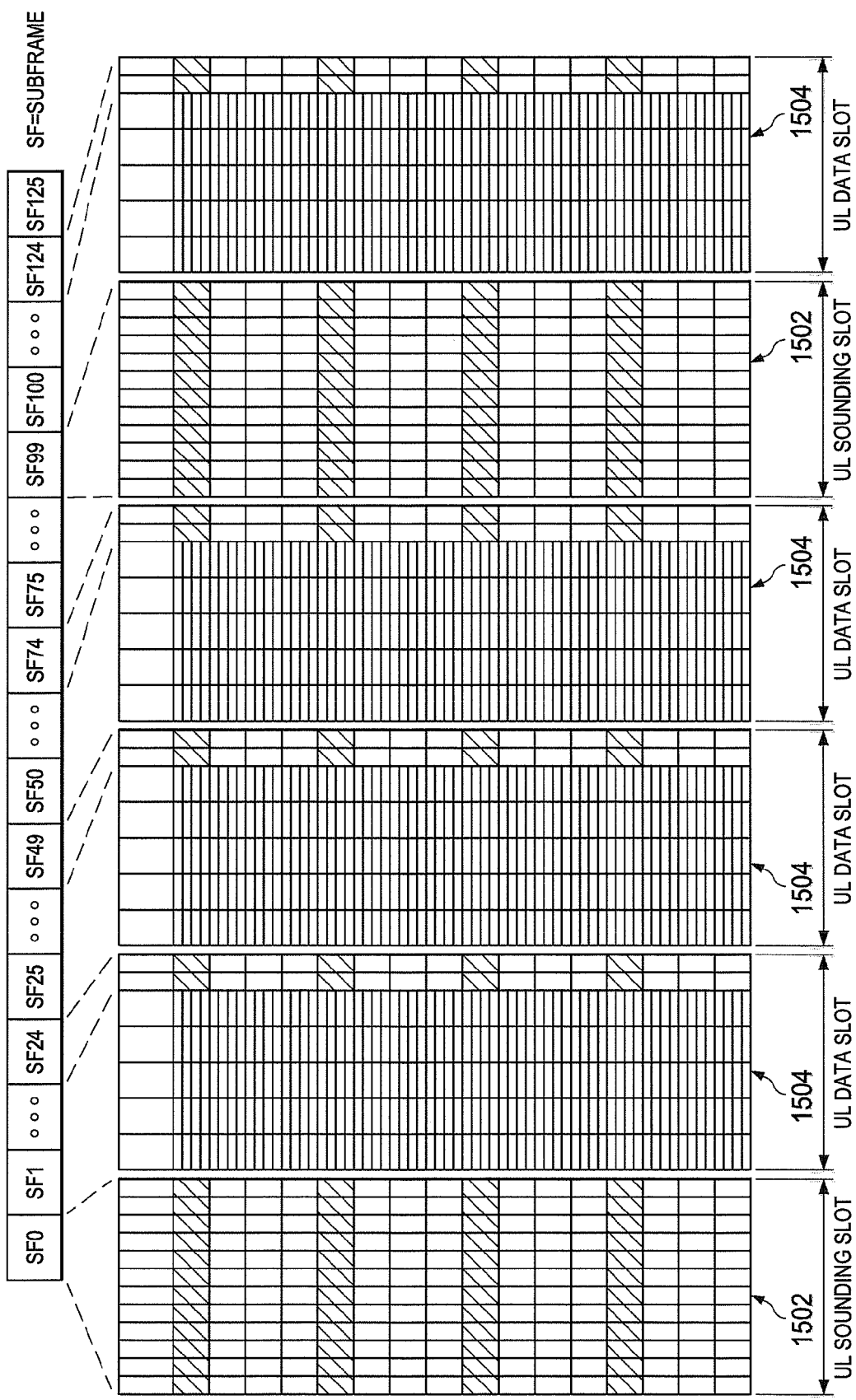
FIG. 15 illustrates the use of multiple sounding channels according to embodiments of the present disclosure.

FIG. 15 illustrates the use of multiple sounding channels according to embodiments of the present disclosure. The embodiment of the present disclosure shown in FIG. 15 is for illustration only. Other embodiments could be used without departing from the scope of this disclosure.

BS 102 can configure multiple sounding channels to transmit SRSs by MS 116. The multiple sounding channels can have different periodicities and different configurations for transmitting SRSs. Such configurations are designed to enable different scales of channel measurements from MS 116 to BS 102. BS 102 can configure multiple sounding assignments based on parameters like mobile speed, CQI reports, RACH reception from MS 116, and other factors.

For example, MS 116 can be assigned two sounding channels where a first sounding channel 1502 is on an UL sounding slot, like configuration 1206 of FIG. 12, to enable systematic scanning a first set of transmit and receive beam pairs. A second sounding channel 1504 is assigned on an DL data slot, like configuration 1208 of FIG. 12, to scan using a second subset of transmit and receive beam pairs. The second subset of transmit and receive beam pairs could include the same transmit beams as used in the first sounding channel 1502; and a subset from the set of receive beams used by BS 102 in receiving SRS from the first sounding channel 1502.

The periodicities of the two sounding channels 1502-1504 are configured such that the first sounding channel 1502 on an UL sounding slot is updated at a much slower rate than the second sounding channel 1504 on the UL data slot. For some subframes, where both the first sounding channel 1502 and the second sounding channel 1504 have assignments that collide, MS 116 will use the first sounding channel assignment to transmit the SRS. This example is illustrated in FIG. 15 where the periodicity of the first sounding channel is set to once every one hundred subframes and the periodicity of the second sounding channel is set to once every twenty-five subframes.

In alternative or additional embodiments that accord with the present disclosure, BS 102 can signal an aperiodic sounding channel to MS 116 in which a periodic sounding channel is already configured. An aperiodic sounding channel does not repeat over a number of frames, such that after a sounding is finished, i.e., when MS 116 has finished its repetitions, the sounding will not be repeated. In contrast, a periodic sounding channel does repeat over a number of frames, such that after a sounding is finished, it will be repeated once every number of frames, e.g., once every $2^{p-1}$ frames, where p is a periodicity specified in an UL Sounding configuration message from BS 102.

An aperiodic sounding channel can be signaled by setting a periodicity (p) field to 0b000 in a second or subsequent UL sounding channel configuration message received by MS 116. The second UL sounding channel configuration message can also include a change in other parameters associated with the sounding channel. The changed parameters can include, for example, the number ($N_{b}^{MS,s}$) of beams MS 116 should transmit SRS on or the number ($N_{REP}^{SRS}$) of times the UL-SRS corresponding to a transmit beam is to be repeated. When accompanied with a change in one or more parameters compared to an earlier configured uplink sounding channel, MS 116 interprets it as a new aperiodic UL sounding channel and transmits UL-SRSs in the scheduled resources. Alternatively, if no other parameters of the sounding channel are changed, MS 116 interprets the periodicity (p) being set to 0b000 as a de-allocation or termination of the configured uplink sounding channel.

BS 102 can explicitly signal an aperiodic sounding channel to MS 116 for whom a sounding channel is previously configured. In addition to setting the periodicity (p) field to 0b000 in UL sounding channel configuration message, BS 102 can use an additional bit to indicate if this is an allocation of a new sounding channel or a termination of a sounding channel configured in a previous UL Sounding configuration message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station (BS) for communicating with a mobile station (MS), the method comprising:
   configuring an uplink sounding channel for the MS using an uplink configuration message,
   wherein the uplink configuration message specifies if an Uplink-Sounding Reference Symbol (UL-SRS) is to be transmitted over one of an uplink slot and a particular uplink sounding configuration,
   wherein a number of beams for which the UL-SRS is to be transmitted is indicated in the uplink configuration message,
   wherein at least one of the number of beams is repeated over a different OFDM symbol according to a parameter in the uplink configuration message, and
   wherein a periodicity with which the UL-SRS is to be transmitted is indicated in the uplink configuration message.

2. The method of claim 1, further comprising:
   receiving the UL-SRS in the uplink sounding channel based on the uplink configuration message,
   wherein the UL-SRS corresponding to a first beam selected from the number of beams transmitted by the MS is repeated over multiple sounding opportunities and received using different receive beams until all of a configured number of repetitions are completed and a next beam selected from the number of beams is repeated over multiple sounding opportunities until all configured repetitions are received,
   wherein the UL-SRS reception is continued over successive sounding opportunities until the UL-SRS for the number of beams and the configured number of repetitions are received,
   wherein the UL-SRS corresponding to the number of beams are received in successive sounding opportunities followed by repetitions of the UL-SRS until all the UL-SRS for the number of beams and the configured numbers of repetitions are received, and
   wherein a sounding opportunity is an OFDM symbol configured to carry the UL-SRS.

3. The method of claim 2, further comprising:
   receiving the UL-SRS in the uplink sounding channel, the UL-SRS transmitted from the MS according to the uplink configuration message that was received by the MS,
   wherein multiple digital chains in an apparatus that transmitted the UL-SRS select the number of beams on which the UL-SRS is to be transmitted independently,
   wherein the UL-SRS corresponding to the number of beams chosen is transmitted from the multiple digital chains using different resources on a same sounding opportunity and repeated until the UL-SRS for the number of beams and the numbers of repetitions are transmitted for each of the multiple digital chains,
   wherein the UL-SRS is transmitted from the multiple digital chains on successive sounding opportunities until all of the number of beams and the numbers of repetitions are transmitted for all digital chains.

4. A method of a mobile station (MS) for communicating with a base station (BS), the method comprising:
   receiving an uplink configuration message that configures an uplink sounding channel,
   wherein the uplink configuration message specifies if an Uplink-Sounding Reference Symbol (UL-SRS) is to be transmitted over one of an uplink slot and a particular uplink sounding configuration,
   wherein a number of beams for which the UL-SRS is to be transmitted is indicated in the uplink configuration message,
   wherein at least one of the number of beams is repeated over a different OFDM symbol according to a parameter in the uplink configuration message, and
   wherein a periodicity with which the UL-SRS is to be transmitted is indicated in the uplink configuration message.

5. The method of claim 4, further comprising:
   transmitting the UL-SRS in the uplink sounding channel based on the uplink configuration message,
   wherein the UL-SRS corresponding to a first beam selected from the number of beams transmitted by the MS is repeated over multiple sounding opportunities and received using different receive beams until all of a configured number of repetitions are complete and a next beam selected from the number of beams is repeated over multiple sounding opportunities until all configured repetitions are transmitted,
   wherein the UL-SRS transmission is continued over successive sounding opportunities until the UL-SRS for the number of beams and the configured number of repetitions are transmitted,
   wherein the UL-SRS corresponding to the number of beams are transmitted in successive sounding opportunities followed by repetitions of the UL-SRS until all the UL-SRS for the number of beams and the configured numbers of repetitions are transmitted, and
   wherein a sounding opportunity is an OFDM symbol configured to carry the UL-SRS.

6. The method of claim 5,
   wherein multiple digital chains of the MS each select the number of beams on which the UL-SRS is to be transmitted independently,
   wherein the UL-SRS corresponding to the number of beams is transmitted from the multiple digital chains using different resources on a same sounding opportunity and repeated until the UL-SRS for the number of beams and the configured number of repetitions for each beam are transmitted for each of the multiple digital chains,
   wherein the different resources comprise different subcarriers,
   wherein the UL-SRS is transmitted by the multiple digital chains on successive sounding opportunities until all of the number of beams and the numbers of repetitions are transmitted for all digital chains.

7. A mobile station (MS) for communicating with a base station (BS), the MS comprising:
   receive processing circuitry configured to receive an uplink configuration message that configures an uplink sounding channel,
   wherein the uplink configuration message specifies if an Uplink-Sounding Reference Symbol (UL-SRS) is to be transmitted over one of an uplink slot and a particular uplink sounding configuration,
   wherein a number of beams for which the UL-SRS is to be transmitted is indicated in the uplink configuration message,
   wherein at least one of the number of beams is repeated over a different OFDM symbol according to a parameter in the uplink configuration message, and wherein a periodicity with which the UL-SRS is to be transmitted is indicated in the uplink configuration message.

8. The MS of claim 7, further comprising:
transmit processing circuitry configured to transmit the UL-SRS in the uplink sounding channel based on the uplink configuration message,
wherein the UL-SRS corresponding to a first beam selected from the number of beams transmitted by the MS is repeated over multiple sounding opportunities and received using different receive beams until all of a configured number of repetitions are complete and a next beam selected from the number of beams is repeated over multiple sounding opportunities until all configured repetitions are transmitted,
wherein the UL-SRS transmission is continued over successive sounding opportunities until the UL-SRS for the number of beams and the configured number of repetitions are transmitted,
wherein the UL-SRS corresponding to the number of beams are transmitted in successive sounding opportunities followed by repetitions of the UL-SRS until all the UL-SRS for the number of beams and the configured numbers of repetitions are transmitted, and
wherein a sounding opportunity is an OFDM symbol configured to carry the UL-SRS.

9. The MS of claim 8,
wherein multiple digital chains of the MS each selected the number of beams on which the UL-SRS is to be transmitted independently,
wherein the UL-SRS corresponding to the number of beams is transmitted from the multiple digital chains using different resources on a same sounding opportunity and repeated until the UL-SRS for the number of beams and the configured number of repetitions for each beam are transmitted for each of the multiple digital chains,
wherein the different resources comprise different subcarriers,
wherein the UL-SRS is transmitted by the multiple digital chains on successive sounding opportunities until all of the number of beams and the numbers of repetitions are transmitted for all digital chains.

10. A base station (BS) for communicating with a mobile station (MS), the BS comprising:
one or more processors to configure an uplink sounding channel for the MS using an uplink configuration message,
wherein the uplink configuration message specifies if an Uplink-Sounding Reference Symbol (UL-SRS) is to be transmitted over one of an uplink slot and a particular uplink sounding configuration,
wherein a number of beams for which the UL-SRS is to be transmitted is indicated in the uplink configuration message,
wherein at least one of the number of beams is repeated over a different OFDM symbol according to a parameter in the uplink configuration message, and
wherein a periodicity with which the UL-SRS is to be transmitted is indicated in the uplink configuration message.

11. The BS of claim 10, further comprising:
receive processing circuitry configured to receive the UL-SRS in the uplink sounding channel from the MS based on the uplink configuration message received by the MS,
wherein the UL-SRS corresponding to a first beam selected from the number of beams transmitted by the MS is repeated over multiple sounding opportunities and received using different receive beams until all of a configured number of repetitions are completed and a next beam selected from the number of beams is repeated over multiple sounding opportunities until all configured repetitions are received,
wherein the UL-SRS reception is continued over successive sounding opportunities until the UL-SRS for the number of beams and the configured number of repetitions are received,
wherein the UL-SRS corresponding to the number of beams are received in successive sounding opportunities followed by repetitions of the UL-SRS until all the UL-SRS for the number of beams and the configured numbers of repetitions are received, and
wherein a sounding opportunity is an OFDM symbol configured to carry the UL-SRS.

12. The BS of claim 11,
wherein multiple digital chains in an apparatus that transmitted the UL-SRS select the number of beams on which the UL-SRS is to be transmitted independently,
wherein the UL-SRS corresponding to the number of beams chosen is transmitted from the multiple digital chains using different resources on a same sounding opportunity and repeated until the UL-SRS for the number of beams and the number of repetitions are transmitted for each of the multiple digital chains,
wherein the different resources comprise different subcarriers,
wherein the UL-SRS is transmitted from the multiple digital chains on successive sounding opportunities until all of the number of beams and the numbers of repetitions are transmitted for each of the multiple digital chains.

* * * * *